United States Patent
Yang et al.

(10) Patent No.: US 10,867,510 B2
(45) Date of Patent: Dec. 15, 2020

(54) REAL-TIME TRAFFIC MONITORING WITH CONNECTED CARS

(71) Applicant: TOYOTA JIDOSHA KABUSHIKI KAISHA, Toyota (JP)

(72) Inventors: Hao Yang, Mountain View, CA (US); Rui Guo, Mountain View, CA (US); Kentaro Oguchi, Menlo Park, CA (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 280 days.

(21) Appl. No.: 15/946,686

(22) Filed: Apr. 5, 2018

(65) Prior Publication Data
US 2019/0311614 A1 Oct. 10, 2019

(51) Int. Cl.
*G08G 1/01* (2006.01)
*G06K 9/00* (2006.01)
(Continued)

(52) U.S. Cl.
CPC .......... *G08G 1/0145* (2013.01); *G01C 21/28* (2013.01); *G01C 21/3492* (2013.01); *G05D 1/0246* (2013.01); *G06K 9/00825* (2013.01); *G08G 1/0112* (2013.01); *G08G 1/0116* (2013.01); *G08G 1/0133* (2013.01);
(Continued)

(58) Field of Classification Search
None
See application file for complete search history.

(56) References Cited

U.S. PATENT DOCUMENTS 6,236,933 B1   5/2001   Lang
6,781,523 B2   8/2004   Matsui et al.
(Continued)

FOREIGN PATENT DOCUMENTS

JP   2009146138 A   7/2009

OTHER PUBLICATIONS

Redmill et al., "Using Transit or Municipal Vehicles as Moving Observer Platforms for Large Scale Collection of Traffic and Transportation System Information", 14th International IEEE Conference on Intelligent Transportation Systems, Oct. 2011, pp. 1089-1095. (Year: 2011).*
(Continued)

*Primary Examiner* — Todd Melton
(74) *Attorney, Agent, or Firm* — VLP Law Group, LLP

(57) ABSTRACT

A connected vehicle includes a first sensor that captures first sensor data to identify one or more dynamics of the connected vehicle, and a second sensor that has a first perspective directed toward an external environment and captures second sensor data reflecting an unconnected vehicle and one or more roadside infrastructures. The second sensor data from the connected vehicle is processed to identify the unconnected vehicle and the one or more roadside infrastructures, and to determine one or more dynamics of the unconnected vehicle. A dynamic road map is generated based on the determined one or more dynamics of the connected vehicle, the one or more dynamics of the unconnected vehicle, and the one or more roadside infrastructures. The first vehicle platform, the second vehicle platform, and/or another vehicle platform relative to the first vehicle platform or the second vehicle platform may be navigated based on the dynamic road map.

24 Claims, 13 Drawing Sheets

(51) Int. Cl.
  *G05D 1/02* (2020.01)
  *G01C 21/28* (2006.01)
  *G01C 21/34* (2006.01)
  *G08G 1/0968* (2006.01)
  *G08G 1/052* (2006.01)
  *G08G 1/04* (2006.01)

(52) U.S. Cl.
  CPC ............ *G08G 1/0141* (2013.01); *G08G 1/04* (2013.01); *G08G 1/052* (2013.01); *G08G 1/096855* (2013.01)

(56) References Cited

U.S. PATENT DOCUMENTS

| | | | |
|---|---|---|---|
| 7,979,198 B1 | 7/2011 | Kim et al. | |
| 9,377,528 B2* | 6/2016 | Birken | G01S 13/00 |
| 10,437,252 B1* | 10/2019 | Liu | G01C 21/36 |
| 2018/0240335 A1* | 8/2018 | Dong | G08G 1/0112 |
| 2019/0271550 A1* | 9/2019 | Breed | G01S 19/49 |

OTHER PUBLICATIONS

Seo et al., "Estimation of Flow and Density Using Probe Vehicles with Spacing Measurement Equipment", Transportation Research Part C: Emerging Technologies, vol. 53, Apr. 2015, pp. 134-150. (Year: 2015).*

Kerner et al., "Traffic State Detection with Floating Car Data in Road Networks," Proceedings of the 8th International IEEE Conference on Intelligent Transportation Systems, Sep. 13, 2005 (6 pages).

Reinthaler et al., "Evaluation of Speed Estimation by Floating Car Data Within the Research Project Dmotion," Proceedings of the 14th World Congress on Intelligent Transportation Systems, Oct. 2007 (7 pages).

De Fabritiis et al., "Traffic Estimation and Prediction Based on Real Time Floating Car Data," Proceedings of the 11th International IEEE Conference on Intelligent Transportation Systems, Oct. 12, 2008 (7 pages).

* cited by examiner

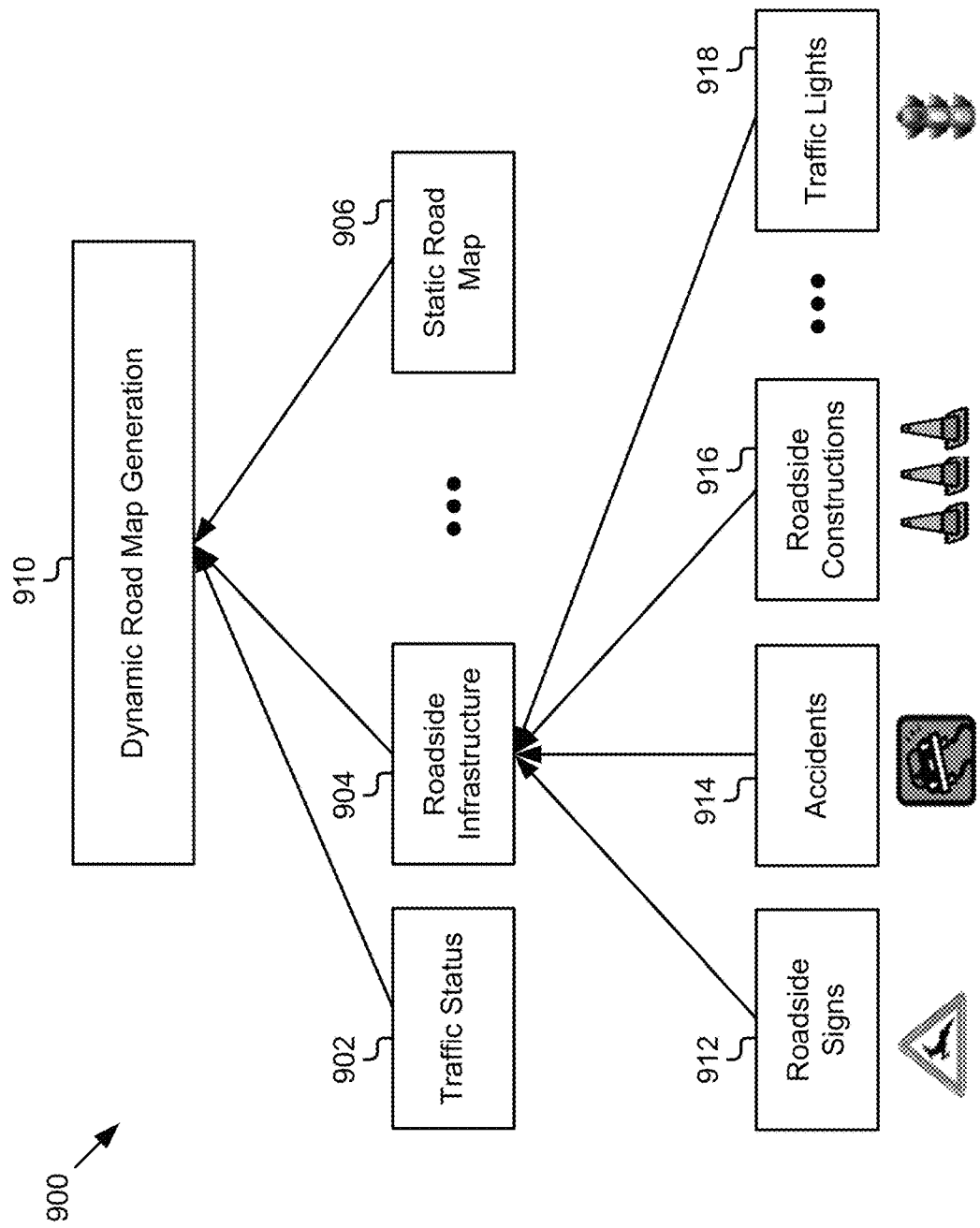

REAL-TIME TRAFFIC MONITORING WITH CONNECTED CARS

BACKGROUND

The present disclosure relates to traffic monitoring. In a more particular example, the disclosure relates to real-time traffic monitoring with multiple connected cars.

With the increasing connected vehicles (CVs) on roads and the development of roadside wireless communication devices, monitoring traffic conditions with CVs in real-time becomes possible. However, the low penetration rate of CVs and the high cost of installing and maintaining roadside infrastructures have limited their applications. For instance, for a GPS-based connected vehicle system, it is not appropriate to detect many traffic features (such as vehicle queue lengths, intersection delays, roadside construction, etc.). Its low market penetration rate has further prevented the system to collect comprehensive traffic information for monitoring the traffic in real-time. For another roadside wireless communication device-based system, the high cost has prevented its large-scale implementation, and thus traffic conditions where the system is not installed (such as freeway segments, uninterrupted arterial corridors, etc.) are not monitored. Additionally, it is also unable to describe the dynamics of the vehicles, such as speed and acceleration in this system. Other existing systems, including an inter-vehicle communication-based traffic chain system for congestion estimation and some floating car data-based systems for road link speed and congestion estimation, also face the problems of low-penetration rate, and the limited accuracy and limited capacity in capturing certain traffic features, and thus are also unable to provide comprehensive real-time monitoring of traffic situation.

SUMMARY

The subject matter described in this disclosure overcomes the deficiencies and limitations of the existing solutions by providing novel technology for identifying unconnected vehicles (UnCVs) and roadside infrastructures and determining their dynamics and status based on the information collected by CVs.

According to one innovative aspect of the subject matter described in this disclosure, a computer-implemented method comprises: determining a current geographic location of first vehicle platform; determining, using one or more sensors of the first vehicle platform, one or more first vehicle dynamics for the first vehicle platform; receiving a first set of images captured by one or more vehicle platform sensors associated with the first vehicle platform, the first set of images relating to a second vehicle platform located proximate the first vehicle platform; determining one or more second dynamics of the second vehicle platform based on the first set of images captured by the one or more vehicle platform sensors of the first vehicle platform; and generating a dynamic road map based on the one or more dynamics of the first vehicle platform and the one or more second dynamics of the second vehicle platform; and navigating, based on the dynamic road map, one or more of the first vehicle platform, the second vehicle platform, and another vehicle platform relative to the first vehicle platform or the second vehicle platform.

In general, another innovative aspect of the subject matter described in this disclosure may be embodied in systems comprising one or more processors including logic executable to perform operations comprising: determining a current geographic location of first vehicle platform; determining, using one or more sensors of the first vehicle platform, one or more first vehicle dynamics for the first vehicle platform; receiving a first set of images captured by one or more vehicle platform sensors associated with the first vehicle platform, the first set of images relating to a second vehicle platform located proximate the first vehicle platform; determining one or more second dynamics of the second vehicle platform based on the first set of images captured by the one or more vehicle platform sensors of the first vehicle platform; and generating a dynamic road map based on the one or more dynamics of the first vehicle platform and the one or more second dynamics of the second vehicle platform.

These and other implementations may each optionally include one or more of the following features: receiving a second set of images captured by one or more vehicle platform sensors associated with a third vehicle platform, the second set of images relating to the second vehicle platform; determining an identity of the second vehicle platform based on a comparison of the first set of images captured from the first vehicle platform and the second set of images captured from the third vehicle platform; that determining the one or more dynamics of the second vehicle platform based on the first set of images captured from the first vehicle platform includes detecting a first object in the first set of images captured from the first vehicle platform and determining the first object in the first set of images to be driving related and determining the one or more dynamics of the second vehicle platform by determining one or more dynamics of the first object; that determining the one or more dynamics of the second vehicle platform based on the first set of images captured from the first vehicle platform includes determining relative latitudinal information and longitudinal information of the second vehicle platform relating to the first vehicle platform based on the first set of images captured from the first vehicle platform and determining the one or more dynamics of the second vehicle platform based on the relative latitudinal information and longitudinal information of the second vehicle platform relating to the first vehicle platform and the one or more dynamics of the first vehicle platform; that generating the dynamic road map based on the one or more dynamics of the first vehicle platform and the one or more dynamics of the second vehicle platform comprises includes determining road link-based traffic information including one or more of road link average speed, road link average density, road link travel time, road link average delay, and road link intersection average delay and determining lane-based traffic information including one or more of lane average speed, lane average density, and lane average delay, lane travel time, lane average delay, and lane intersection average delay and integrating the road link-based traffic information and the lane-based traffic information into a static road map to generate the dynamic road map; that the first vehicle platform is a connected vehicle platform that is equipped with network access for wireless data communication and the second vehicle platform is an unconnected vehicle platform without the network access; that generating the dynamic road map including determining one or more dynamics of one or more connected vehicle platforms and determining one or more dynamics of one or more unconnected vehicle platforms based on one or more images captured by one or more vehicle platform sensors of one or more of the one or more connected vehicle platforms and generating the dynamic road map based on the one or more dynamics of the one or more connected vehicle platforms and the one or more dynamics of the one or more of unconnected vehicle platforms; that the first set of images captured by the one or more vehicle platform sensors associated with the first vehicle platform include a series of images of the second vehicle platform captured in a time window by one of the one or more vehicle platform sensors associated with the first vehicle platform; determining one or more roadside infrastructure information based on the first set of images captured by the one or more vehicle platform sensors of the first vehicle platform; generating the dynamic road map based on the one or more roadside infrastructure information; integrating the dynamic road map into one or more implementations of vehicle platform navigation, path planning, and traffic control; determining one or more dynamics for a third vehicle platform; generating one or more instructions for the third vehicle platform based on the one or more dynamics of the third vehicle platform and the generated dynamic road map; controlling one or more actuators of the third vehicle platform to navigate third vehicle platform according to the one or more instructions; identifying a request for a route plan from one device associated with a moving platform; identifying lane level traffic status for one or more candidate routes based on the dynamic route map; determining an optimal route based on the lane level traffic status of the one or more candidate routes; generating one or more alerts based on information of the dynamic road map; and transmitting the one or more alerts to corresponding parties for their attention.

Other implementations of one or more of these and other aspects include corresponding systems, apparatus, and computer programs, configured to perform the actions of methods, encoded on non-transitory computer storage devices.

The novel technology for identifying UnCVs and roadside infrastructures and determining their dynamics and status based on the information collected by CVs presented in this disclosure is particularly advantageous in a number of respects. For example, the technology described herein is capable of generating a dynamic road map based not only on the dynamics of the CVs, but also on the dynamics of the UnCVs, which overcomes the limitations of low-penetration rate experienced by the CVs in other existing systems. This greatly increases the coverage of vehicles that can be monitored by the disclosed system, and thus improves its accuracy and reliability in real-time traffic monitoring. For another example, the present technology can be deployed in a distributable manner, and thus, is suitable for implementation in individual collaborative vehicles of the vehicular network. Accordingly, the high cost of installing and maintaining roadside infrastructures can be avoided. Additionally, the technology described herein can be easily integrated into many existing applications, e.g., traffic control, path planning, vehicle navigation, etc.

Further non-limiting advantages and benefits include an association process involved in identifying an unconnected vehicles based on a comparison of objects identified from different images captured by different CVs. This may greatly improve the reliability and accuracy of the identification of the UnCVs.

It should be understood that the foregoing advantages are provided by way of example and that the technology may have numerous other advantages and benefits.

The disclosure is illustrated by way of example, and not by way of limitation in the figures of the accompanying drawings in which like reference numerals are used to refer to similar elements.

BRIEF DESCRIPTION OF THE DRAWINGS

FIG. 9 is a flowchart of an example method for generating a dynamic road map.

DESCRIPTION

The technology described herein can generate a comprehensive dynamic road map based on not only CVs but also UnCVs and roadside infrastructures. The CVs may include exterior sensors that continuously capture images of the UnCVs and roadside infrastructures, which may then be used to identify and locate the UnCVs and roadside infrastructures and to track their status, relying on machine learning models or different algorithms. The tracked status of the UnCVs and roadside infrastructures may combine with the dynamics of the CVs to generate and update a dynamic road map. Once generated, the dynamic road map can be implemented in various applications in real-time traffic monitoring, such as automatic driving, assisted driving, congestion control, roadside accident dispatch, etc. As described in further detail below, the technology also includes methods and corresponding systems that can associate UnCVs and roadside infrastructures identified from different CVs.

Figure 1:
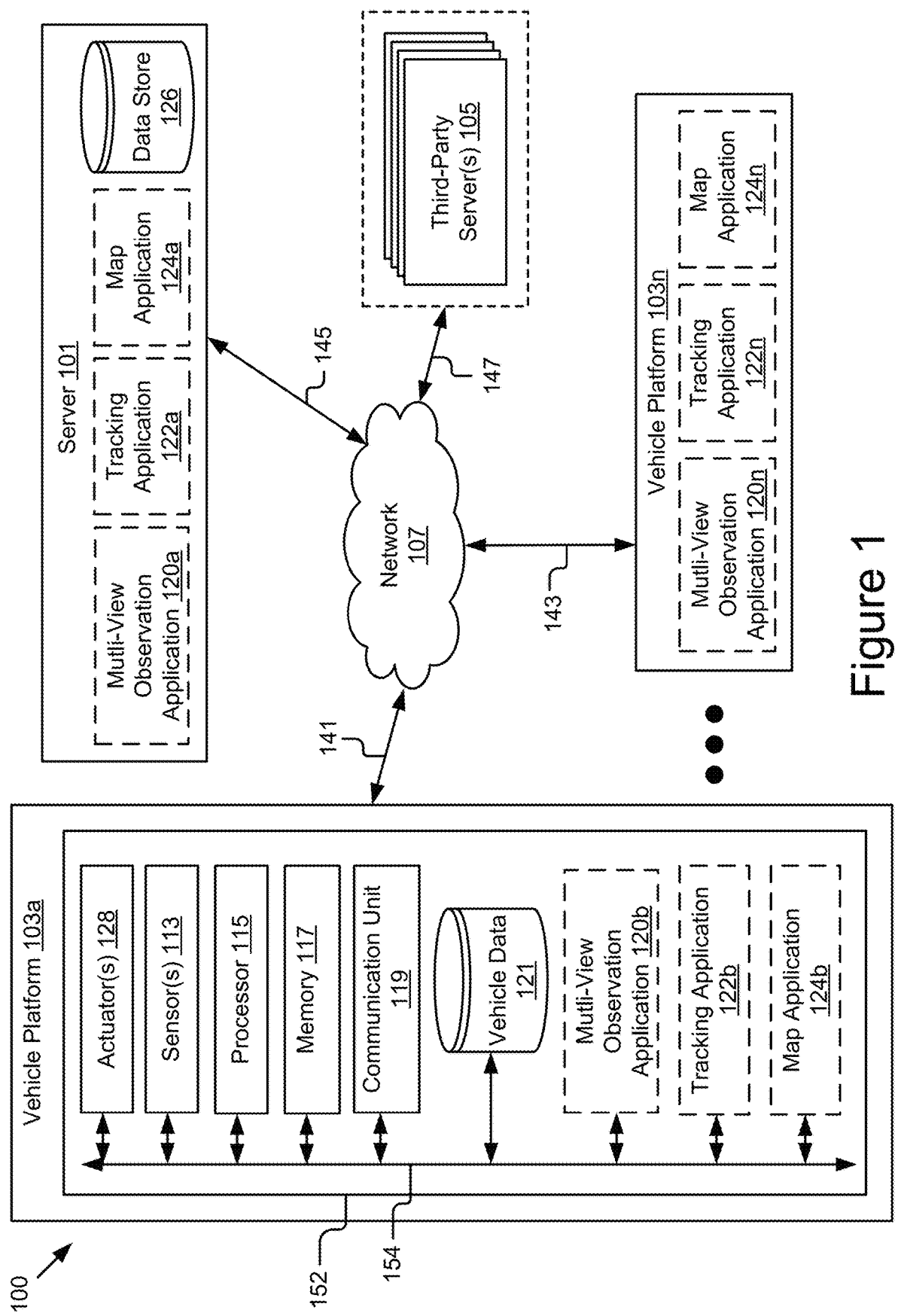
FIG. 1 is a block diagram of an example system for real-time traffic monitoring with connected cars.

FIG. 1 is a block diagram of an example system 100 for real-time traffic monitoring with connected vehicles. As shown, the system 100 includes a server 101, one or more vehicle platforms 103*a* . . . 103*n*, and third-party server(s) 105 coupled for electronic communication via a network 107. In FIG. 1 and the remaining figures, a letter after a reference number, e.g., "103*a*," represents a reference to the element having that particular reference number. A reference number in the text without a following letter, e.g., "103," represents a general reference to instances of the element bearing that reference number. It should be understood that the system 100 depicted in FIG. 1 is provided by way of example and the system 100 and/or further systems contemplated by this present disclosure may include additional and/or fewer components, may combine components and/or divide one or more of the components into additional components, etc. For example, the system 100 may include any number of vehicle platforms 103, third-party servers 105, networks 107, or servers 101.

The network 107 may be a conventional type, wired and/or wireless, and may have numerous different configurations including a star configuration, token ring configuration, or other configurations. For example, the network 107 may include one or more local area networks (LAN), wide area networks (WAN) (e.g., the Internet), personal area networks (PAN), public networks, private networks, virtual networks, virtual private networks, peer-to-peer networks, near field networks (e.g., Bluetooth®, NFC, etc.), vehicular networks, and/or other interconnected data paths across which multiple devices may communicate.

The network 107 may also be coupled to or include portions of a telecommunications network for sending data in a variety of different communication protocols. Example protocols include, but are not limited to, transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other suitable protocols. In some embodiments, the network 107 may be a wireless network using a connection such as DSRC (Dedicated Short Range Communication), WAVE, 802.11p, a 3G, 4G, 5G+network, WiFi™, satellite networks, vehicle-to-vehicle (V2V) networks, vehicle-to-infrastructure/infrastructure-to-vehicle (V2I/I2V) networks, vehicle-to-infrastructure/vehicle-to-everything (V2I/V2X) networks, or any other wireless networks. In some embodiments, the network 107 may be a vehicular wireless networks having limited resources, e.g., limited communication bandwidth that may cause considerable transmission latency, etc. Although FIG. 1 illustrates a single block for the network 107 that couples to the server 101, the vehicle platform(s) 103, and the third-party server(s) 105, it should be understood that the network 107 may in practice comprise any number of combination of networks, as noted above.

The vehicle platform(s) 103 include computing device(s) 152 having sensor(s) 113, processor(s) 115, memory(ies) 117, communication unit(s) 119, a vehicle data store 121, a multi-view observation application 120, a tracking application 122, and a map application 124. Examples of computing device(s) 152 may include virtual or physical computer processors, control units, micro-controllers, etc., which are coupled to other components of the vehicle platform(s) 103, such as one or more sensors 113, actuators 128 (e.g., actuators, motivators, etc.), etc. The vehicle platform(s) 103 may be coupled to the network 107 via signal line 141, and may send and receive data to and from other vehicle platform(s) 103, the third-party server(s) 105, and/or the server(s) 101. In some embodiments, the vehicle platform(s) 103 are capable of transporting from one point to another. Non-limiting examples of the vehicle platform(s) 103 include a vehicle, an automobile, an agricultural machine, a motorcycle, a bicycle, a bus, a boat, a plane, a bionic implant, a robot, or any other platforms with non-transitory computer electronics (e.g., a processor, a memory or any combination of non-transitory computer electronics). The vehicle platform(s) 103 may be referred to herein as vehicle(s).

The processor(s) 115 may execute software instructions (e.g., tasks) by performing various input/output, logical, and/or mathematical operations. The processor(s) 115 may have various computing architectures to process data signals. The processor(s) 115 may be physical and/or virtual, and may include a single core or plurality of processing units and/or cores. In the context of the vehicle platform 103, the processor may be an electronic control unit (ECU) implemented in the vehicle platform 103 such as a car, although other types of platform are also possible and contemplated. In some embodiments, the ECUs may receive and store the sensor data as vehicle operation data in the vehicle data store 121 for access and/or retrieval by the multi-view observation application 120, tracking application 122, and/or map application 124. For instance, the ECUs may implement models, machine learning logic(s) (e.g., software, code, etc.), that are trained to generate compact representations of detected objects, or to identify locations of the detected objects. For another instance, the ECUs may implement dynamic road map generation and updates. In some implementations, the processor(s) 115 may be capable of generating and providing electronic display signals to input/output device(s), supporting the display of images, capturing and transmitting images, performing complex tasks including various types of object recognition and feature extraction, etc. In some implementations, the processor(s) 115 may be coupled to the memory(ies) 117 via the bus 154 to access data and instructions therefrom and store data therein. The bus 154 may couple the processor(s) 115 to the other components of the vehicle platform(s) 103 including, for example, the sensor(s) 113, the memory(ies) 117, the communication unit(s) 119, and/or and the vehicle data store 121.

The multi-view observation application 120 is software and/or hardware logic executable to generate compact representations of detected objects in multiple images, determine the similarity between the detected objects using the compact representations, and associate the multiple images based on the determined similarity. As illustrated in FIG. 1, the server 101 and the vehicle platform 103a . . . 103n may include instances 120a and 120b 120n of the multi-view observation application 120. In some embodiments, each instance 120a and 120b . . . 120n may comprise one or more components of the multi-view observation application 120 depicted in FIG. 2, and may be configured to fully or partially perform the functionalities described herein depending on where the instance resides. In some embodiments, the multi-view observation application 120 may be implemented using software executable by one or more processors of one or more computer devices, using hardware, such as but not limited to a field-programmable gate array (FPGA), an application-specific integrated circuit (ASIC), etc., and/or a combination of hardware and software, etc. The multi-view observation application 120 may receive and process the sensor data and/or the vehicle data, and communicate with other elements of the vehicle platform 103 via the bus 154, such as the memory 117, the communication unit 119, the vehicle data store 121, etc. The multi-view observation application 120 is described in details below with reference to at least FIGS. 2A and 5A.

The tracking application 122 is software and/or hardware logic executable to perform object tracking over time. As illustrated in FIG. 1, the server 101 and/or the vehicle platform 103a . . . 103n may include instances 122a and 122b . . . 122n of the tracking application 122. In some embodiments, the tracking application 122 may be implemented using software executable by one or more processors of one or more computer devices, using hardware, such as but not limited to a field-programmable gate array (FPGA), an application-specific integrated circuit (ASIC), etc., and/or a combination of hardware and software, etc. In some embodiments, the tracking application 122 may perform object tracking (e.g., vehicle locations, signal light status, etc.) to monitor various objects captured in multiple images. In some embodiments, the multi-view observation application 120 and/or the tracking application 122 may be incorporated into other applications (e.g., localization applications, map application 124, navigation applications, 3D modeling applications, etc.) to provide accurate road scene analyses, thereby facilitating the functionalities of these other applications.

The map application 124 is software and/or hardware logic executable to perform dynamic road map generation. As illustrated in FIG. 1, the server 101 and/or the vehicle platform 103a . . . 103n may include instances 124a and 124b . . . 124n of the map application 124. In some embodiments, the map application 124 may be implemented using software executable by one or more processors of one or more computer devices, using hardware, such as but not limited to a field-programmable gate array (FPGA), an application-specific integrated circuit (ASIC), etc., and/or a combination of hardware and software, etc. In some embodiments, the map application 124 may perform dynamic map generation to reflect real-time traffic status in an area. In some embodiments, the map application 124 may receive and process the sensor data, vehicle data, data from other vehicle applications 120 and 122, and/or data from third-party server(s) 105. In some embodiments, the map application 124 may be incorporated into other applications (e.g., localization applications, safe-driving applications, navigation applications, 3D modeling applications, etc.) to provide real-time road traffic information, thereby facilitating the functionalities of these other applications. The map application 124 is described in details below with reference to at least FIGS. 3.

The memory(ies) 117 includes a non-transitory computer-usable (e.g., readable, writeable, etc.) medium, which can be any tangible non-transitory apparatus or device that can contain, store, communicate, propagate or transport instructions, data, computer programs, software, code, routines, etc., for processing by or in connection with the processor(s) 115. For example, the memory(ies) 117 may store the multi-view observation application 120, the tracking application 122, and/or the map application 124. In some implementations, the memory(ies) 117 may include one or more of volatile memory and non-volatile memory. For example, the memory(ies) 117 may include, but is not limited to, one or more of a dynamic random access memory (DRAM) device, a static random access memory (SRAM) device, a discrete memory device (e.g., a PROM, FPROM, ROM), a hard disk drive, an optical disk drive (CD, DVD, Blue-ray™, etc.). It should be understood that the memory(ies) 117 may be a single device or may include multiple types of devices and configurations.

The communication unit 119 transmits data to and receives data from other computing devices to which it is communicatively coupled (e.g., via the network 107) using wireless and/or wired connections. The communication unit 119 may include one or more wired interfaces and/or wireless transceivers for sending and receiving data. The communication unit 119 may couple to the network 107 and communicate with other computing nodes, such as other vehicle platform(s) 103, server(s) 101, and/or third-party server(s) 105, etc. The communication unit 119 may exchange data with other computing nodes using standard communication methods, such as those discussed above.

The sensor(s) 113 includes any type of sensors suitable for the vehicle platform(s) 103. The sensor(s) 113 may be configured to collect any type of signal data suitable to determine characteristics of the vehicle platform 103 and/or its internal and external environments. Non-limiting examples of the sensor(s) 113 include various optical sensors (CCD, CMOS, 2D, 3D, light detection and ranging (LIDAR), cameras, etc.), audio sensors, motion detection sensors, barometers, altimeters, thermocouples, moisture sensors, infrared (IR) sensors, radar sensors, other photo sensors, gyroscopes, accelerometers, speedometers, steering sensors, braking sensors, switches, vehicle indicator sensors, windshield wiper sensors, geo-location sensors, orientation sensor, wireless transceivers (e.g., cellular, WiFi™, near-field, etc.), sonar sensors, ultrasonic sensors, touch sensors, proximity sensors, distance sensors, etc. In some embodiments, one or more sensors 113 may include externally facing sensors provided at the front side, rear side, right side, left side, bottom, and/or top of the vehicle platform 103 in order to capture the situational context surrounding the vehicle platform 103.

In some embodiments, the sensor(s) 113 may include one or more image sensors (e.g., optical sensors) configured to record images including video images and still images, may record frames of a video stream using any applicable frame rate, and may encode and/or process the video and still images captured using any applicable methods. In some embodiments, the image sensor(s) 113 can capture images of surrounding environments within their sensor range. For example, in the context of a vehicle platform, the image sensors 113 can capture the environment around the vehicle platform 103 including roads, buildings, roadside structures, infrastructures (e.g., roadside signs, accidents, roadside constructions, traffic lights, etc.), static road objects, and/or dynamic road objects (e.g., vehicle platforms 103, pedestrians, bicycles, animals, etc.), etc. In some embodiments, the image sensors 113 may be mounted on the vehicle roof and/or inside the vehicle platform 103 to sense in any direction (forward, rearward, sideward, upward, downward facing, etc.) relative to the moving direction of the vehicle platform 103. In some embodiments, the image sensors 113 may be multidirectional (e.g., LIDAR). In some embodiments, the image sensors 113 installed on different vehicle platforms 103 may have different viewpoints and/or view angles and may be configured with different settings, installations, and/or configurations.

The actuator(s) 128 include mechanical and/or electrical devices that are capable of producing or inhibiting motion. The actuator(s) 128 may be electric, pneumatic, hydraulic, magnetic, mechanical, thermodynamic, and/or magnetic, and/or a combination of the foregoing. Non-limiting example actuator(s) 128 include electric motors, motorized linkages, signaling components, servomechanisms, hydraulic cylinders, pneumatic actuators, corresponding gearing, connectors, and kinematic components, combustion engines, jet engines, etc. The actuators are be coupled to components via linkages, transmissions, drivelines, hydraulics, and/or other assemblies, such as those including wheels, props, turbo fans, blowers, jets, and/or other components, that are capable of accelerating, decelerating, and steering the vehicle 103.

The vehicle data store 121 includes a non-transitory storage medium that stores various types of data. For example, the vehicle data store 121 may store vehicle data being communicated between different components of a given vehicle platform 103 using a bus, such as a controller area network (CAN) bus. In some embodiments, the vehicle data may include vehicle operation data collected from multiple sensors 113 coupled to different components of the vehicle platform 103 for monitoring operating states of these components, e.g., transmission, speed, acceleration, deceleration, wheel speed (Revolutions Per Minute—RPM), steering angle, braking force, etc. In some embodiments, the vehicle data may include moving direction, vehicle geolocation (e.g., GPS (Global Positioning System) coordinates) indicating geographic location of the vehicle platform 103, etc. In some embodiments, the vehicle data may include any data and information received by a transceiver (e.g. from other roadside units, other vehicles, any third-party server(s) 105, etc.).

In some embodiments, the vehicle data may also include internal and external scene images captured by one or more image sensors 113 of the vehicle platform 103 and the image data associated with these images. In some embodiments, the image data may include an image timestamp indicating date and time when the image is captured, the sensor position, and the sensor orientation, settings of the image sensor 113, and/or other camera, camera position, vehicle platform sensor, CAN, etc., data when capturing the image. In some embodiments, the image data may also describe one or more objects detected in the image. For example, the image data may include modality feature(s), initial representation(s), and/or compact representation(s) of each detected objects in the image. The initial representation may be referred to herein as the initial feature representation of the detected object, and the compact representation may be referred to herein as the compact feature representation of the detected object. In some embodiments, the vehicle data may also include any images, image data, related extracted features, initial representation(s), and/or compact representation(s) received from other vehicle platform(s) 103.

In some embodiments, the vehicle data store 121 may store model data of a representation learning model and a location recognition model. In some embodiments, the representation learning model may be a machine learning model being trained to generate the compact representations (e.g., compact feature vectors) that efficiently represent the detected objects and/or to determine the similarity of the detected objects using the compact representations. In some embodiments, the location recognition model may be also a machine learning model being trained to identify a relative location (e.g., relative to the image sensor 113) of an identified object. In some embodiments, the representation learning model and/or the location recognition model may be implemented in the form of convolutional neural network, support vector machine, etc. Other system architectures for implementing machine learning models with various types of supervised learning algorithm and/or unsupervised learning algorithm are also possible and contemplated. In some embodiments, the model data may include one or more parameters of the representation learning model and/or the location recognition modal. For example, the model data may include mapping parameters of one machine learning logic learned from the training process for mapping the initial feature vector to the compact feature vector. For another example, the model data may also include orientation parameters of another machine learning logic learned from the training process for mapping a location of an object in an image to its relative orientation to an image sensor 113.

The server 101 includes a hardware and/or virtual server that include a processor, a memory, and network communication capabilities (e.g., a communication unit). In some embodiments, the server 101 may have larger computing capabilities and computing resources than other entities of the system 100 (e.g., the vehicle platforms 103). The server 101 may be communicatively coupled to the network 107, as reflected by signal line 145. In some embodiments, the server may send and receive data to and from other entities of the system 100, e.g., one or more vehicle platforms 103. As depicted, the server 101 may include an instance of the multi-view observation application 120*a*, the tracking application 122*a*, and/or the map application 124*a*.

The server 101 may also include a data store 120 that stores various types of data for access and/or retrieval by these applications. For example, the data store 120 may store the compact representations (e.g., compact feature vectors) of detected objects received from the vehicle platform(s) 103, training data, model data of the representation learning model, modal data of the location recognition model, etc. In some embodiments, the training data for the representation learning model may include multiple groups of training images and the predetermined target output associated with each group of training images. In some embodiments, the predetermined target output may indicate whether the objects included in the group of training images represent the same object. For example, the training data may include positive training images with the predetermined target output="1" (indicating that objects included in the positive training images are the same), and negative training images with the predetermined target output="0" (indicating that objects included in the negative training images are not the same). In some embodiments, the model data of the representation learning model may include parameters of the model at various points in the training process. For example, the model data of the representation learning model may include mapping parameters of one or more machine learning logic being trained to generate compact feature vectors of detected objects, scoring parameters of one or more machine learning logic being trained to generate the similarity score, etc. In some embodiments, the model data of the representation learning model may also include model configurations of the representation learning model. For example, the model configurations of the representation learning model may define the convergence point indicating when the training process of the model is complete (e.g., a predetermined number of training cycles and/or a predetermined feedback difference are satisfied, etc.).

The third-party server(s) 105 includes a hardware and/or virtual server that include a processor, a memory, and network communication capabilities (e.g., a communication unit). The third-party server(s) 105 may be communicatively coupled to the network 107, as reflected by signal line 147. In some embodiments, the third-party server(s) 105 may send and receive data to and from other entities of the system 100, e.g., one or more vehicle platforms 103, and/or the server 101.

In some embodiments, the third-party server(s) 105 may include any server that generates, disseminates, or receives traffic-related information. For instance, the third-party server(s) 105 may include some traffic application servers that provide general traffic-related information (e.g., map applications, navigation applications, accident report applications, weather forecast applications, etc.). For instance, the third-party server(s) 105 may include some online social media servers that generate and disseminate traffic-related news, comments, messages, blogs, etc. For instance, the third-party server(s) 105 may include some servers that directly generate and disseminate traffic-related information for some specific areas. For example, some roadside units may provide traffic information for some short-range covered areas. For another example, some roadside infrastructures may themselves disseminate some information related to these infrastructures (e.g., a roadside deer migration zone sign may automatically disseminate electronic message to inform that a vehicle is entering or exiting the deer migration zone). The information collected from any of these third-party servers 105 may be communicated to other entities (e.g., the server 101 and one or more vehicle platforms 103) of the system through the signal line 147.

Other variations and/or combinations are also possible and contemplated. It should be understood that the system 100 illustrated in FIG. 1 is representative of an example system and that a variety of different system environments and configurations are contemplated and are within the scope of the present disclosure. For instance, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc.

Figure 2A:
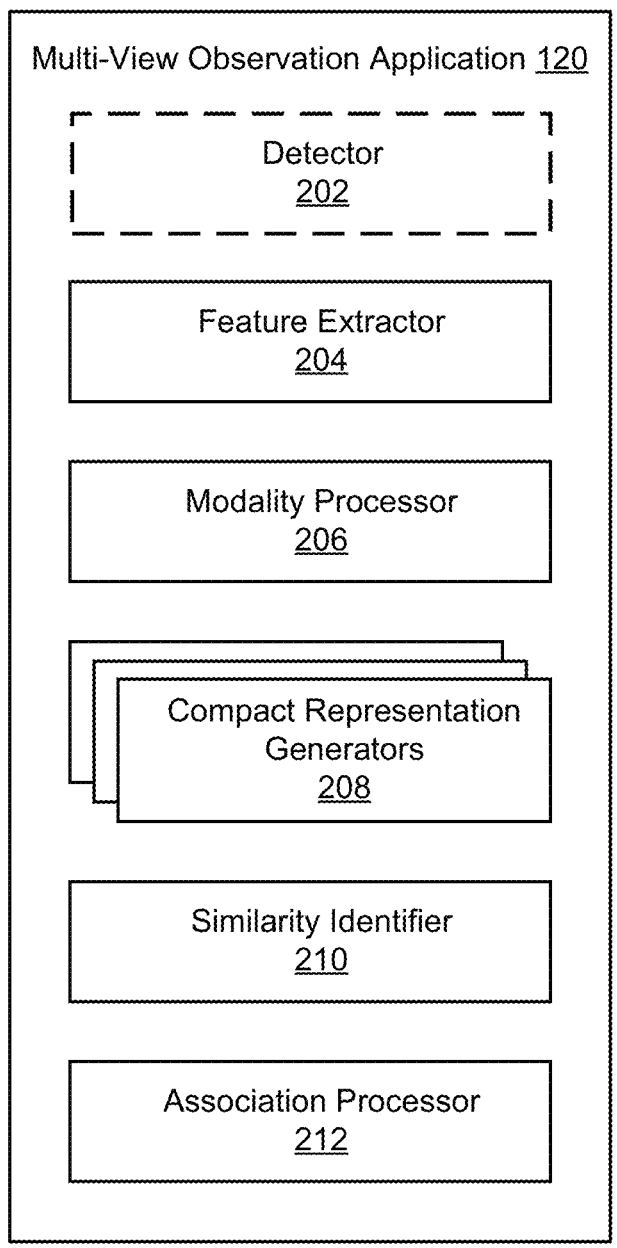
FIG. 2A is a block diagram of an example multi-view observation application.

FIG. 2A is a block diagram of an example multi-view observation application 120. As depicted, the multi-view observation application 120 may include a detector 202, a feature extractor 204, a modality processor 206, one or more compact representation generators 208, a similarity identifier 210, and an association processor 212. It should be understood that the multi-view observation application 120 may include additional components such as, but not limited to, a configuration engine, an encryption/decryption engine, etc., and/or these various components may be combined into a single engine or divided into additional engines.

The detector 202, the feature extractor 204, the modality processor 206, the one or more compact representation generators 208, the similarity identifier 210, and the association processor 212 may be implemented as software, hardware, or a combination of the foregoing. In some embodiments, the detector 202, the feature extractor 204, the modality processor 206, the one or more compact representation generators 208, the similarity identifier 210, and the association processor 212 may be communicatively coupled by the bus 154 and/or the processor 115 to one another and/or the other components of the computing device 152. In some embodiments, one or more of the components 202, 204, 206, 208, 210, and 212 are sets of instructions executable by the processor 115 to provide their functionality. In further embodiments, one or more of the components 202, 204, 206, 208, 210, and 212 are storable in the memory 117 and are accessible and executable by the processor 115 to provide their functionality. In any of the foregoing embodiments, these components 202, 204, 206, 208, 210, and 212 may be adapted for cooperation and communication with the processor 115 and other components of the computing device 152. The multi-view observation application 120, its components 202, 204, 206, 208, 210, and 212 are described in further detail below with reference to at least FIG. 5A.

As discussed elsewhere herein, the multi-view observation application 120 is software and/or hardware logic executable to associate multiple images captured by multiple vehicle platforms 103. In typical scenarios, multiple vehicle platforms 103 located in the same road area may capture multiple images of the same objects present in that road area from different perspectives. Therefore, in some embodiments, objects in these multiple images may be associated by determining the similarity between the detected objects taken from different vehicle platforms.

In some embodiments, the multi-view observation application 120 may receive two or more images captured by two or more vehicle platform sensors of two or more different vehicles platforms proximate a traffic situation. The multi-view observation application 120 may extract a first set of multi-modal features from first objects in a first image of the two or more images. The first image may be associated with a first vehicle platform 103 of the two or more vehicle platforms 103. For example, a sensor of the first vehicle platform 103 may capture the image, and the sensor may be coupled to provide the image data comprising the image to the multi-view observation application 120, which may pair the image with one or more other images associated with the traffic situation, such as images captured by one or more other vehicle platforms 103 located within a geographic region of the traffic situation. For instance, the multi-view observation application 120 may also extract a second set of multi-modal features from second objects in a second image of the two or more images, the second image associated with a second vehicle platform 103 of the two or more vehicle platforms 103.

In some embodiments, the first vehicle platform, which may represent a computing device (e.g., via the ECU or other computational resources it may have), may include any of the elements discussed herein, such as a first sensor having a first perspective directed toward an external environment external to the first vehicle platform, where the first sensor captures first sensor data reflecting first objects included in the external environment; and a first communication unit for receiving second sensor data from a second vehicle platform, where the second sensor data reflecting second objects included in the external environment from a second perspective. In some embodiments, the second vehicle platform, which may represent a computing device (e.g., via the ECU or other computational resources it may have), similarly includes a second sensor having the second perspective directed toward the external environment external to the second vehicle platform, where the second sensor capturing the second sensor data reflecting first objects included in the external environment, and a second communication unit for sending the second sensor data from the second vehicle platform to the first vehicle platform.

In some embodiments, a hardware server embodied by at least one computing device, the hardware server adapted to train a machine learning model comprising the separate machine learning logic based on the similarity score, wherein a first instance of the machine learning model is installed on the first vehicle platform and a second instance of the machine learning model is installed on the second vehicle platform.

In some embodiments, the multi-view observation application 120 may detect the first objects in the first image and the second objects in the second image, and so forth. The detection may in some cases occur via an instance of the application 120 operating on the respective vehicle platforms 103. Images that contain objects that are relevant to the movement and/or operation of the vehicle platform 103 (e.g., driving related) may be identified by the instance of the multi-view observation application 120 and then paired to form the paired input discussed elsewhere herein. For example, using the above example, the multi-view observation application 120 may determining a first set of objects from the first objects of the first image to be driving-related, and then determine a second set of objects from the second objects of the second image to be driving related, and so forth. These driving-related inputs (e.g., images, sets of sensor data, etc.) may then be paired (e.g., where a pair includes two or more inputs).

In some embodiments, in addition to determining objects in the images as being relevant for similarity learning, the multi-view observation application 120 may receive image-related data including geolocation data describing the geolocation where a given image was captured, and images may further be paired based on a corresponding area or region encompassing that geolocation (so that images capturing different perspectives of a roadway or traffic situation may be identified based on their geolocation data).

In some embodiments, the multi-view observation application 120 may process the first set of multi-modal features and the second set of multi-modal features using separate machine learning logic to produce a first output and a second output, respectively, as discussed further elsewhere herein. In some cases, the first and second set of multi-modal features (up to N sets depending on how many images are being concurrently processed) may be normalized and combined. For instance, in the above example involving the first and second images, the first and second set of multi-modal features may be independently normalized and then combined into respective multi-modal initial feature vectors (e.g., first vector, second vector, etc.).

Responsive to the processing, the multi-view observation application 120 may generate a similarity score quantifying a difference between the first set of multi-modal features and the second set of multi-modal features using the first output and the second output. Using the similarity score, the multi-view observation application 120 may associate a first object by the first image associated with the first vehicle platform 103 and a second object reflected by the second image associated with the second vehicle platform 103, as discussed elsewhere herein. In some embodiments, such object association may be performed using the compact feature representations of objects detected in the images. Once associated, an object may be further processed by other applications (e.g., the tracking application 122 and/or the map application 124).

Figure 2B:
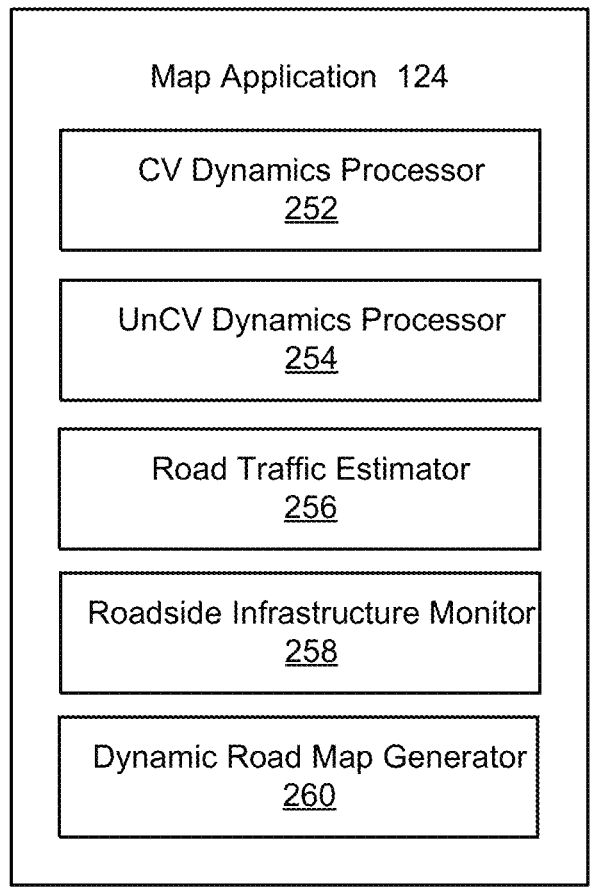
FIG. 2B is a block diagram of an example map application.

FIG. 2B is a block diagram of an example map application 120. As depicted, the map application 124 may include a CV dynamic processor 252, an UnCV dynamic generator 254, a road traffic estimator 256, a roadside infrastructure monitor 258, and a dynamic road map generator 260. It should be understood that the map application may include additional components such as, but not limited to, a configuration engine, an encryption/decryption engine, etc., and/or these various components may be combined into a single engine or divided into additional engines.

The CV dynamic processor 252, the UnCV dynamic generator 254, the road traffic estimator 256, the roadside infrastructure monitor 258, and the dynamic road map generator 260 may be implemented as software, hardware, or a combination of the foregoing. In some embodiments, the CV dynamic processor 252, the UnCV dynamic generator 254, the road traffic estimator 256, the roadside infrastructure monitor 258, and the dynamic road map generator 260 may be communicatively coupled by the bus 154 and/or the processor 115 to one another and/or the other components of the computing device 152. In some embodiments, one or more of the components 252, 254, 256, 258, and 260 are sets of instructions executable by the processor 115 to provide their functionality. In further embodiments, one or more of the components 252, 254, 256, 258, and 260 are storable in the memory 117 and are accessible and executable by the processor 115 to provide their functionality. In any of the foregoing embodiments, these components 252, 254, 256, 258, and 260 may be adapted for cooperation and communication with the processor 115 and other components of the computing device 152.

As discussed elsewhere herein, the map application 120 is software and/or hardware logic executable to generate a comprehensive dynamic road map based on the information collected from CVs. In some embodiments, the map application 120 may cooperate with the multi-view observation application 120 and the tracking application 122 in generating the dynamic road map. In typical scenarios, in a specific road area, there might be multiple vehicle platforms 103 with only a certain percentage of the vehicle platforms 103 are CVs while the other vehicle platforms are UnCVs. In the association process, the associated objects identified from the paired input images by the multi-view observation application 120 may include UnCVs located within the road map area, and the paired input images may be taken by the image sensors 113 of different CVs with the road map area. With each CV may capture one or more UnCVs, and each UnCV may be associated by one or more sets of paired input images, the majority or all of UnCVs in the road map area may then be identified by the multi-view observation application 120. With the identified UnCVs and CVs, the map application 124, combined with the tracking application 120, may generate a comprehensive dynamic road map for that specific road area. The map application 124 and its components 252, 254, 256, 258, and 260 in generating dynamic road map are described in further detail below with reference to at least FIGS. 3-9.

Figure 3:
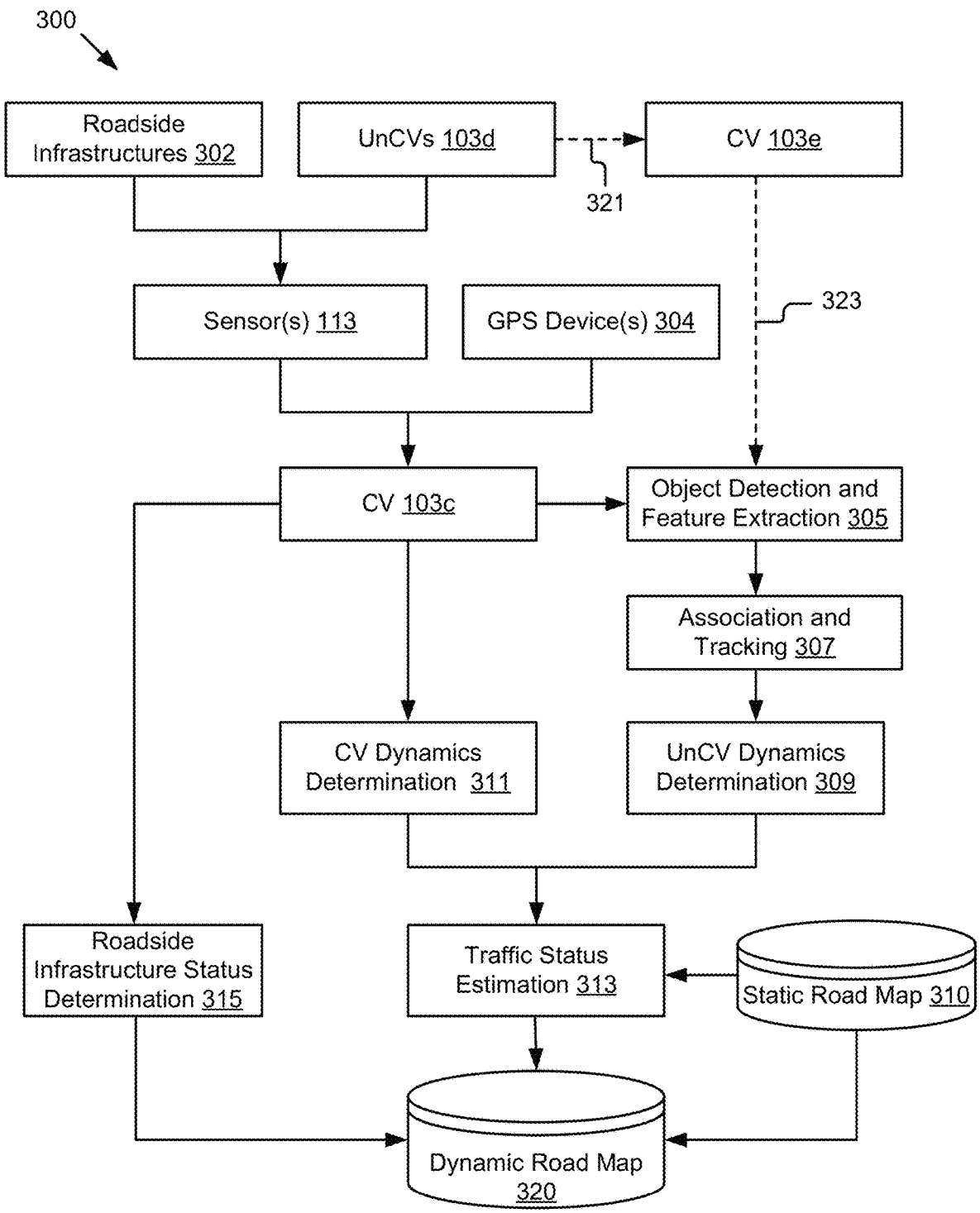
FIG. 3 is a flowchart of an example method for generating a dynamic road map.

FIG. 3 is a flowchart of an example method for generating a dynamic road map. As illustrated, a first CV (e.g., CV 103c) may be navigating in a specific road area. The first CV may include image sensor(s) 113 and GPS devices 304 (may be included in the sensors 113) that assist with monitoring traffic situation in the road area. The image sensor(s) 113 may include one or more exterior sensors that capture images of the external environment of the first CV. The external environment of the CV may include one or more UnCVs (e.g., a UnCV 103d) and some roadside infrastructures 302. The captured images including the one or more UnCVs and some roadside infrastructures 302 may then be transmitted to the memory 117 of the first CV, another CV, or the server 101 for further processing (for instance, for object detection and feature extraction by the multi-view observation application 120). Similarly, a second CV (e.g., CV 103e) navigating in the same road area may also capture images of one or more UnCVs (may also include the UnCV 103d) and some roadside infrastructures 302 for further processing by the CV, another CV, or the server 101.

The captured images from the first CV (may be referred as the first set of images) and the images captured from the second CV (may be referred as the second set of images) may then be independently processed for object detection and feature extraction in block 305. The object detection and feature extraction may allow an identification of one or more objects (e.g. the UnCV 103d, some roadside infrastructure, and other objects) in each set of images. The identified objects from each set of images may then be compared for a similarity to determine whether one or more objects in both sets of images shares the similarity. If one or more objects are determined to be the same objects, they may be then associated in block 307.

The feature extraction in block 305 may also include extracting location-related information to allow an identification of location information for each identified object. The identified location information for each identified object may then allow tracking each identified object at different moments in block 307 from images taken at different moments for that object. Based on the tracked positons at different moments, the dynamics of each identified object including an UnCV (e.g., the UnCV 103*d* ) may then be determined (in block 309) by the UnCV dynamics generator 254.

The dynamics of a CV (e.g., CV 103*c*, CV 103*e* ) may be determined (in block 311) by the CV dynamics generator 252 based on the information collected from the GPS device(s) 304 associated with CV. Based on the determined dynamics for each CV and each identified UnCV, the dynamics of the majority, if not all, of vehicle platforms 103 in that road area may be determined, which, when combined with the information from the static map 310, may allow an estimation (in block 313) of the dynamic traffic status in that area by the road traffic estimator 256.

In some embodiments, the tracking of the identified objects in block 307 may also include tracking location information and/or status (e.g., traffic light status) for the roadside infrastructures at different moments. Additionally or alternatively, roadside infrastructure related information may be collected by other approaches. For instance, some roadside infrastructures may transmit wireless signals or messages to provide traffic-related information. The roadside infrastructure-related information collected from different sources at different moments may the combined to allow an estimation (in block 315) of the dynamic roadside infrastructure status in the map area by the roadside infrastructure monitor 258.

The determined dynamic road traffic status and roadside infrastructure may then be integrated into the static road map 310 to generate a dynamic road map 320 by the dynamic road map generator 260. More detailed description of the process in generating the dynamic road map is further provided below with reference to FIGS. 4-9.

Figure 4:
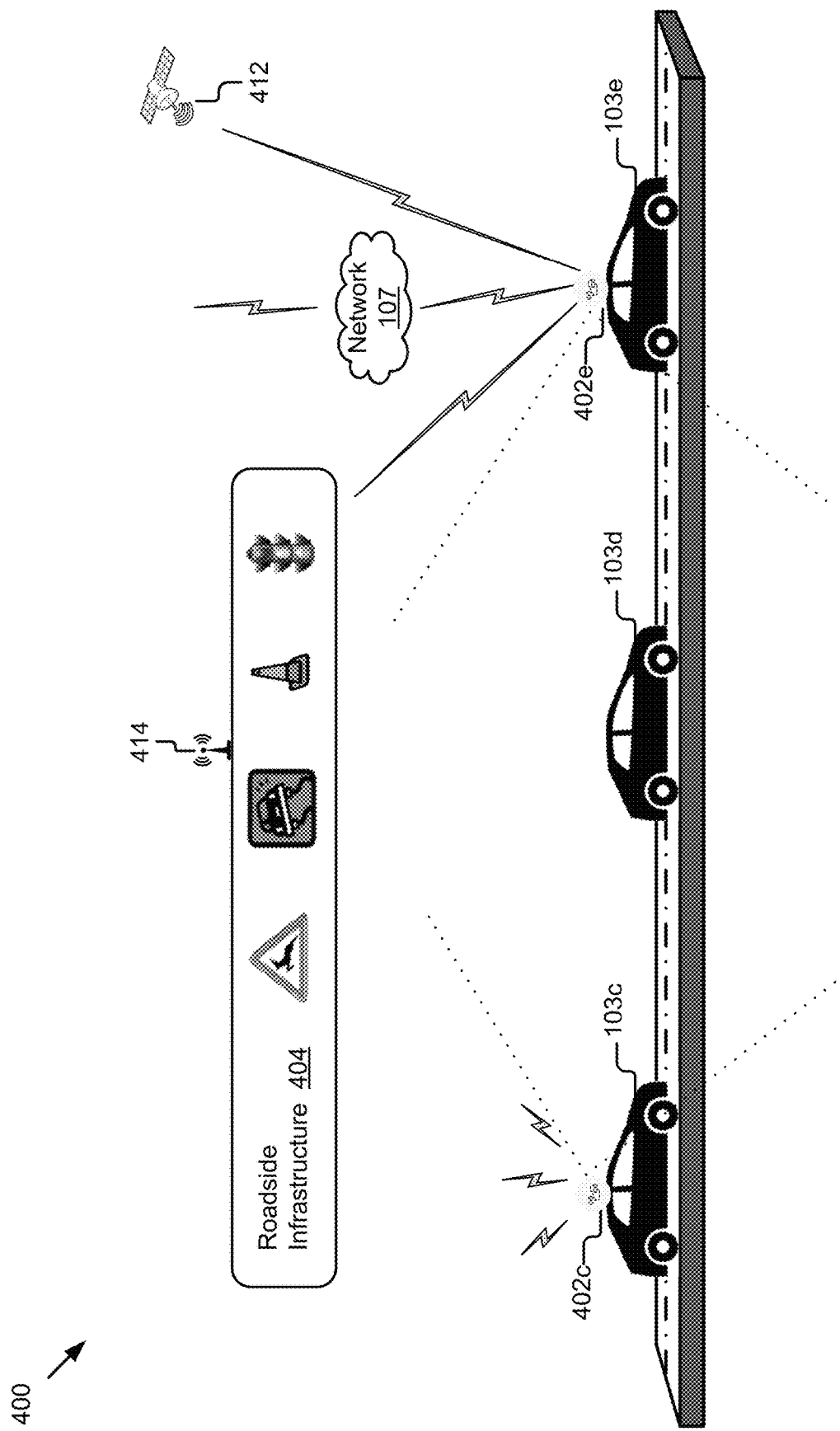
FIG. 4 illustrates an example road segment with two connected vehicles and one unconnected vehicle.

FIG. 4 illustrates an example road segment with two CVs and one UnCVs, to provide further information about the CVs and UnCVs. As its name indicates, a CV may include one or more communication devices (embedded or portable) present in the vehicle that enable connectivity with other devices inside the vehicle and/or enable connection of the vehicle to external devices, networks, applications, services, etc. By incorporating the connectivity, a CV may enable vehicle-to-vehicle (V2V) communications, and/or vehicle-to-infrastructure (V2I) communication to collect and/or provide necessary information to help understand the situation around the vehicle. On the other hand, an UnCV may not include the enabled connectivity, and thus may not report its traffic situations, but relies on other CVs or roadside units or systems to collect and/or provide its traffic information.

To enable the connectivity of a CV and its assistance with monitoring any UnCV, a CV may be equipped with necessary devices, systems, applications, etc. For easier illustration and simpler description, these necessary devices, systems, or applications may be referred together as a monitoring unit 402. As illustrated in the figure, two CVs 103*c* or 103*e* may each include a monitoring unit 402*c* or 402*e*. Each of the monitoring unit 402*c* or 402*e* may include any device or system that assists with monitoring and/or collecting traffic-related information. For instance, the monitoring unit 402*e* may include a geopositioning (e.g., GPS) receiver that communicates with the GPS satellite 412 or there geopositioning system to determine location, time, and drive velocity of the CV 103*e*. For instance, the monitoring unit 402*e* may include also one or more transceivers to communicate with another CV, the server 101, and/or the third party server(s) 105 via the network 107. Additionally, the monitoring unit 402*e* may also include one or more transceivers that wirelessly communicate with roadside units (not shown) or the roadside infrastructure 404 that provide traffic or roadside infrastructure information via wireless communication with an access point 414 (e.g., a roadside unit).

In some embodiments, a monitoring unit 402 may include one or more camera sensors that are enabled to capture images, videos, and/or audios for external environments, such as UnCVs and roadside infrastructures. For instance, the monitoring unit 402*c* or 402*e* in FIG. 4 may include one or more camera sensors that are enabled to capture the UnCV 103*d* and part of the roadside infrastructure 404 located within its capturing range as indicated by the dotted lines. In some embodiments, a monitoring unit 402 may include multiple camera sensors that each independently captures images and/or videos with different orientations. For instance, a monitoring unit 402 may include four cameras that each captures the surrounding area towards north, south, west, or east.

In some embodiments, the monitoring unit 402 in a CV may be manually or automatically adjusted to better monitor the surrounding environment. For instance, based on the V2V and/or V2I communications, a specific region in the road area may be found to require more attentions (e.g., an accident region, a region concentrated with UnCVs, an identified DUI vehicle, etc.). Orientation of one or more cameras and/or sensors in the monitoring unit 402 of one or more CVs may then be manually or automatically adjusted to focus on those specific regions to offer better coverage.

In some embodiments, the monitoring unit 402 in a CV may be manually or automatically activated and/or deactivated. To save the power and/or bandwidth for communication, one or more cameras or sensors in the monitoring unit 402 may be automatically or manually deactivated. For instance, if it is determined that CVs in an area has reached a saturation rate (e.g., a CV: UnCV ratio is large enough to cover all vehicles in that area), the monitoring units 402 on certain CVs may be automatically or manually deactivated to save the power, computing, and data transmission. Other conditions to automatically or manually deactivate the monitoring unit 402 of a CV may include that a CV travels in a rural area, a remote area, a parking lot, a personal property, a military area, a public-prohibited area, etc., or that a CV travels under conditions that don't allow a camera or sensor to collect useful information, such as under heavy rain, snow, really dark environment, etc.

In some embodiments, each CV may capture or monitor multiple CVs in the surrounding area. Therefore, even if the penetration rate for the CVs is low, due to the coverage of multiple UnCVs by each CV, the total number of the UnCV covered by the CVs can be greatly increased. In some embodiments, a single UnCV may be captured by multiple CVs in the surrounding area. As illustrated in FIG. 4, the UnCV 103*d* may be captured by two CVs 103*c* and 103*e*. To ensure accuracy in evaluating the real traffic situation, it might be beneficial to allow an UnCV to be captured by two or more CVs, and thus an association process may be necessary to associate an UnCV captured by different CVs.

Figure 5A:
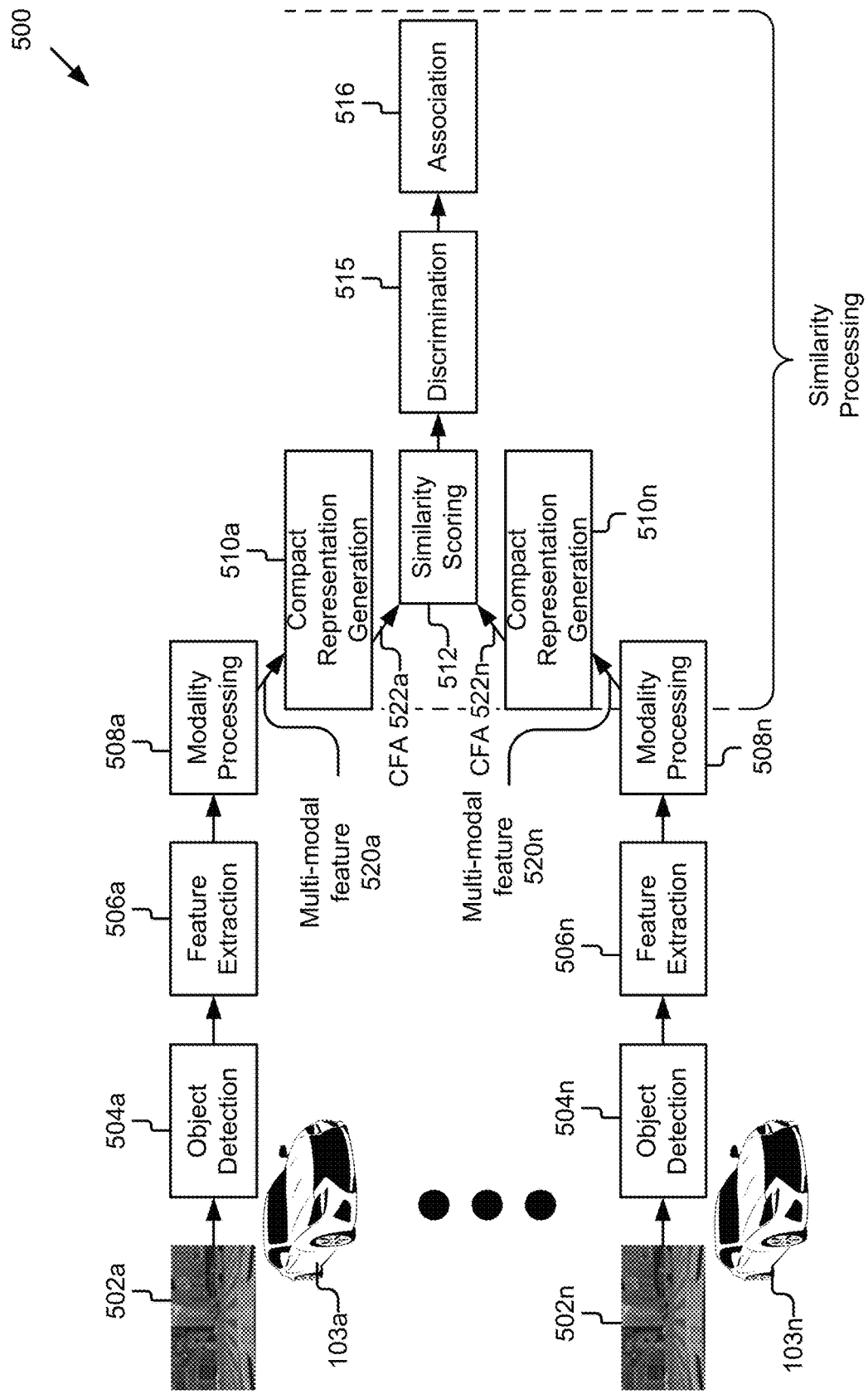
FIG. 5A is a flowchart of an example method for learning compact representation of detected objects and associating an object from multiple vehicles.

FIG. 5A is a flowchart of an example method for learning compact representation of detected objects and associating an object from multiple vehicles. As illustrated, a general association process may include feature extraction and object (e.g., an UnCV) identification in each of the multiple images, similarity comparison of objects identified in those images, and association of the same object(s) detected by different CVs.

In block 502, the cameras or sensors 113 of the CV may capture images of the road scene as the CV travels along the road. In some embodiments, these road scene images may be captured at a predefined rate/interval (e.g., every 5 seconds, 10 seconds, 30 seconds, etc.). In some embodiments, videos may be also taken for the area. In some embodiments, multiple vehicle platforms may capture a shared segment in an area. For instance, CV 103c and CV 103e may happen to capture a shared segment that may include an UnCV 103d.

In block 504, the detector 202 may detect one or more objects in the captured images. For example, the detector 202 may perform object recognition on a captured image (e.g., using vision algorithm) to detect one or more objects present in the road scene.

In block 506, the feature extractor 204 may extract features of the detected objects. This may include determining one or more modality features describing detected objects in the images. For instance, the feature extractor 204 may process the image data to extract one or more of texture features, color features, context features, and/or viewport features of the detected objects to assist with later similarity determination. The extracted texture features may describe the texture of various portions of the detected objects. For instance, geometric shape, structure, and textural pattern of some hood, wheel, and bumper may be identified in the extracted texture features. The extracted color features may include one or more colors of the detected objects. For instance, the extracted color features of detected objects indicate one vehicle is black in color and another similar vehicle next to it is silver in color. The extracted context features may describe background environment around the detected objects. The context features are useful in similarity processing especially when the captured images include objects with identical appearance. As an example, a first image may include a first car having the same appearance as a second car in a second image. However, the extracted context features may indicate that the first car is driving on the road while the second car is parked in front of a building based on their surrounding environments as indicated by the extracted context features. The extracted viewpoint features may indicate the perspective from which the images are captured. These may include moving direction of the vehicle platform 103, the sensor positions and sensor orientations of the image sensors when capturing the images. The viewpoint features is particularly advantageous in similarity processing. As an example, a first image may include a first damaged truck similar to a second damaged truck in a second image. The feature extractor 204 may determine that the first image is captured by the image sensor provided on the left side of the first vehicle platform 103 moving in the north direction, and the second image is captured by the image sensor provided on the left side of the second vehicle platform 103 moving in the south direction. Accordingly, the first damaged truck and the second damaged truck may be determined as representing the same object because the perspectives from which they are captured as indicated by the viewpoint features are compatible.

In block 508, the modality processor 206 may process the modality features describing the detected objects in the image. In some embodiments, the modality processor 206 may normalize and concatenate the modality features to generate an initial representation 520 of the detected object. In particular, the modality features describing the detected object may be converted and/or reorganized to conform to predefined standards. The modality processor 206 may then aggregate the normalized modality features into an initial feature vector that comprehensively describes the detected object. In some embodiments, the initial feature vector of the detected object may include a complete set of modality features with the texture feature(s), the color feature(s), the context feature(s), the viewpoint feature(s), etc. associated with the detected object. As a result, the initial feature vector of the detected object may have a large feature dimension (and thus, large data size) corresponding to the large number of modality features included therein.

In block 510, the compact representation generator 208 may generate the compact representation of the detected object. In particular, the compact representation generator 208 may map the initial representation 520 of the detected object to the compact representation 522 of the detected object. For example, the compact representation generator 208 may map the initial feature vector representing the detected object to a compact feature vector representing the detected object. In some embodiments, the compact feature vector may comprise a fewer number of modality features (and thus, having a lower feature dimension and smaller data size) as compared to the corresponding initial feature vector.

As depicted in FIG. 4, the image capture, the object detection, the feature extraction, the modality processing, and the compact representation generation may be performed in multiple CVs to generate the compact representations 522 of the detected objects in multiple images captured from different perspectives. As discussed elsewhere herein, the compact representations 522 of the detected objects in these captured images may conform to predefined standards, and therefore may have the same format and feature dimension. In some embodiments, the compact representations 522 of the detected objects in the captured images may be input into the similarity identifier 210.

In block 512, the similarity identifier 210 may compute a similarity score reflecting the level of similarity between the compact representations 522 of detected objects in different captured images. As an example, the similarity identifier 210 may compute a similarity score indicating the level of similarity between a first compact representation 522a (e.g., a first compact feature vector) of a first object in a first image captured from a first perspective and an nth compact representation 522n (e.g., an nth compact feature vector) of a second object in a second image captured from a second perspective.

In some embodiments, the compact representation generation performed by the compact representation generator 208 and the similarity score computation performed by the similarity identifier 210 may be used in processing object similarity and may be implemented as a representation learning model. As discussed elsewhere herein, the representation learning model may be a trained to generate the compact representations that efficiently represent the detected objects from the initial representations of the detected objects, and determine the similarity of the detected objects using the generated compact representations.

In some embodiments, the trained representation learning model may be implemented as software, hardware, a combination of the forgoing, etc., in CV 103 (e.g., installed, built, updated to include, stored in memory and executed, etc.) and used during real-time driving to detect and classify objects, process scenes, sharing object and/or scene information with nearby vehicle platforms 103, provide driver and passenger feedback via output devices of the vehicle platforms 103, transmit data to the server 101 for storage in a dynamic map shared across a multiplicity of vehicles forming a traffic ecosystem, used for route computation and navigation instruction provision via navigation applications (e.g., GPS or other geopositioning systems) included in and executed by the vehicle platform, etc. In some embodiments, the machine learning logic(s) embodied by a plurality of the compact representation generators 208a . . . 208n and the similarity identifier 210 may be executed to perform the operations discussed herein.

In block 515, the similarity identifier 210 may determine whether the first object in the first image and the second object in the second image describe the same object based on the similarity score. In some embodiments, the similarity identifier 210 may determine whether the similarity score between the first compact representation 522a of the first object and the nth compact representation 522n of the second object satisfies a predetermined score threshold (e.g., more than 50%). Responsive to determining that the similarity score between the first compact representation 522a of the first object and the nth compact representation 522n of the second object satisfies the predetermined score threshold, the similarity identifier 210 may determine that the first object in the first image and the second object in the second image represent the same object.

In block 516, the association processor 212 may associate the first image and the second image based on the discrimination result in block 515. In particular, if the similarity identifier 210 determines that the first object in the first image and the second object in the second image represent the same object, the association processor 212 may associate the first object in the first image with the second object in the second image. For instance, as depicted in FIG. 4, the association processor 212 may associate the UnCV 103d in the images taken by the CV 103c with the same UnCV 103d in the images taken by the CV 103e.

In some embodiments, a CV may capture multiple UnCVs or other objects in the captured images. Therefore, there might be multiple objects that can be associated in the first images taken by the first CV and the second images taken by the second CV.

Figure 5B:
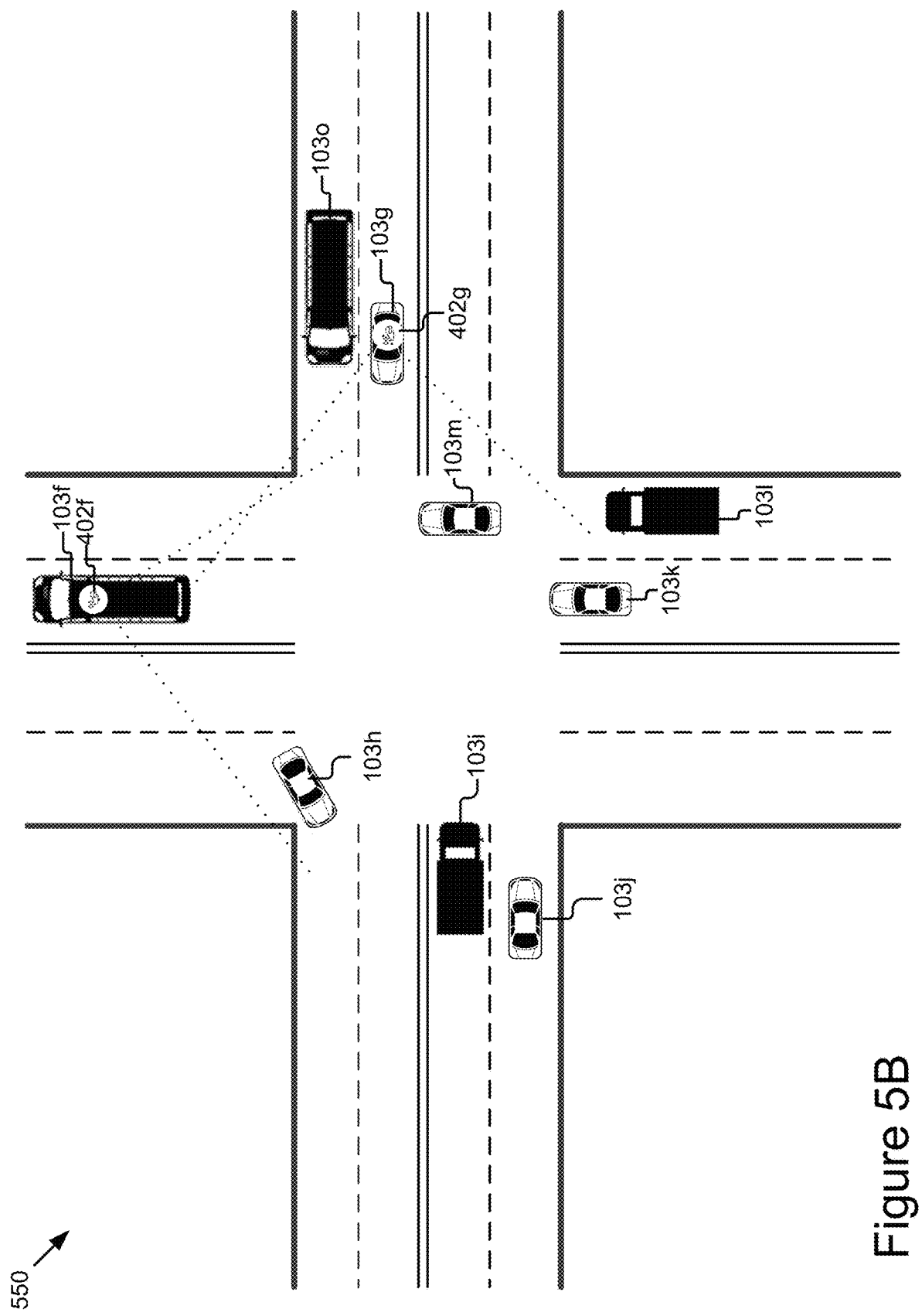
FIG. 5B illustrates an example scenario with multiple unconnected vehicles associated by two connected vehicles.

FIG. 5B illustrates an example scenario with multiple unconnected vehicles associated by two connected vehicles. As illustrated, there are two CVs 103f and 103g in an intersection in a road area. Each CV may be equipped with necessary devices or systems that monitor other UnCVs, as indicated by the monitoring unit 402f or 402g. Each of the monitoring units 402f and 402g may have its coverage area as indicated dotted lines. In the object detection process, each CV may detect different objects based on the images captured from its monitoring unit 402. For instance, the monitoring unit 402f of the CV 103f may detect the UnCVs 103h, 103i, 103k, 103l, and 103m (each may have its unique ID F1, F2, F3, F4, F5), but may not detect 103g and 103o due to its coverage limitation or the UnCV 103j due to its hindered view by the UnCV 103i. Similarly, the monitoring unit 402g associated with the CV 103g may detect the UnCVs 103h, 103i, 103j, 103k, and 103m (each may have its unique ID G1, G2, G3, G4, G5), but may not detect the UnCVs 103i and 103o and the CV 103f. After the association process as depicted in FIG. 5A, four UnCVs 103h (F1, G1), 103i (F2, G2), 103k (F3, G4), and 103m (F5, G5) may be determined to the same objects detected by both the CV 103f and the CV 103g, and thus are associated. The association of four UnCVs by two CVs may greatly increase the covered vehicles in the intersection, and thus greatly increase the numbers of vehicles available for determining road traffic status, including tracking their dynamic activities of these vehicles.

Figure 6:
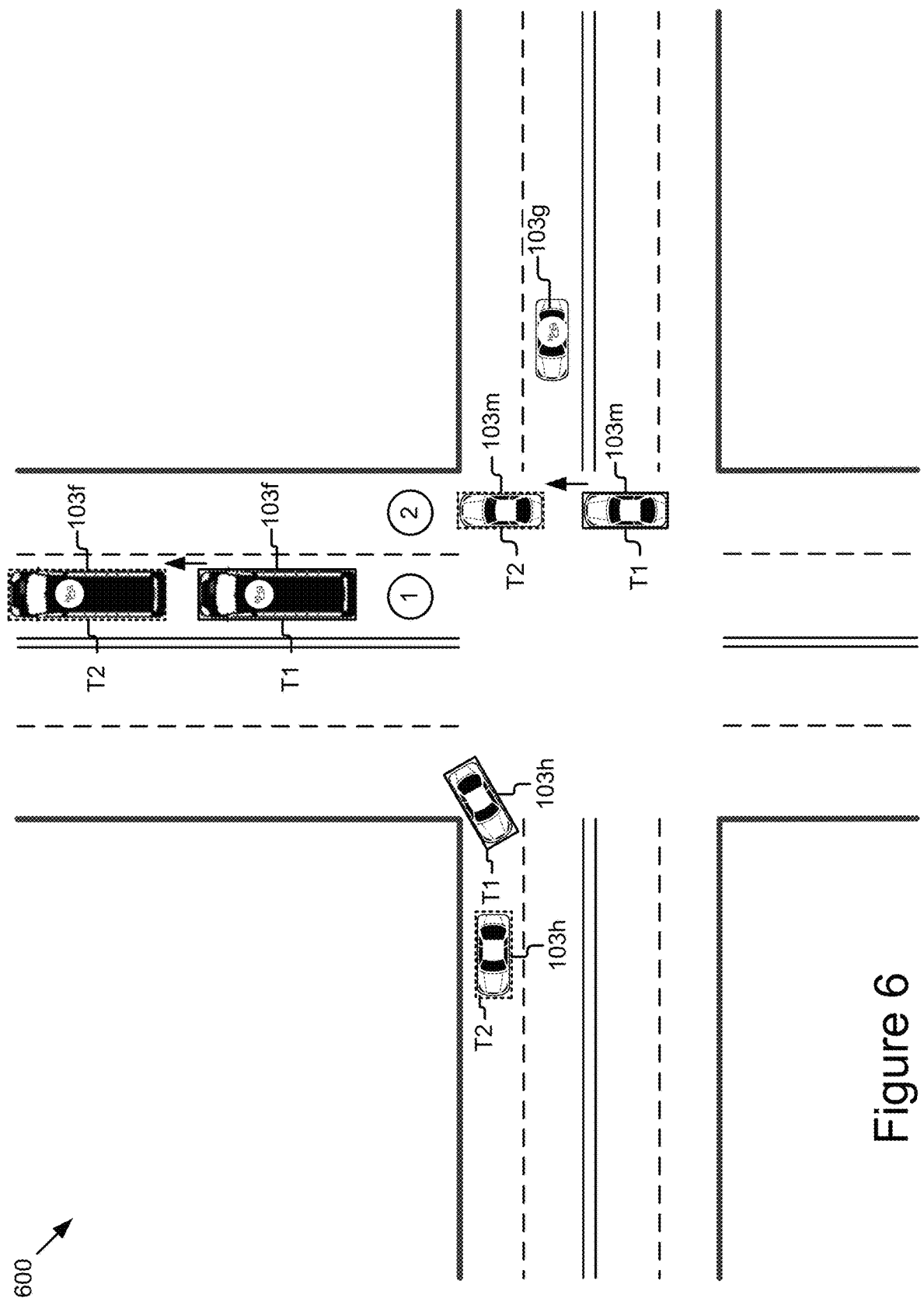
FIG. 6 illustrates an example scenario for tracking connected and unconnected vehicles.
Figure 7:
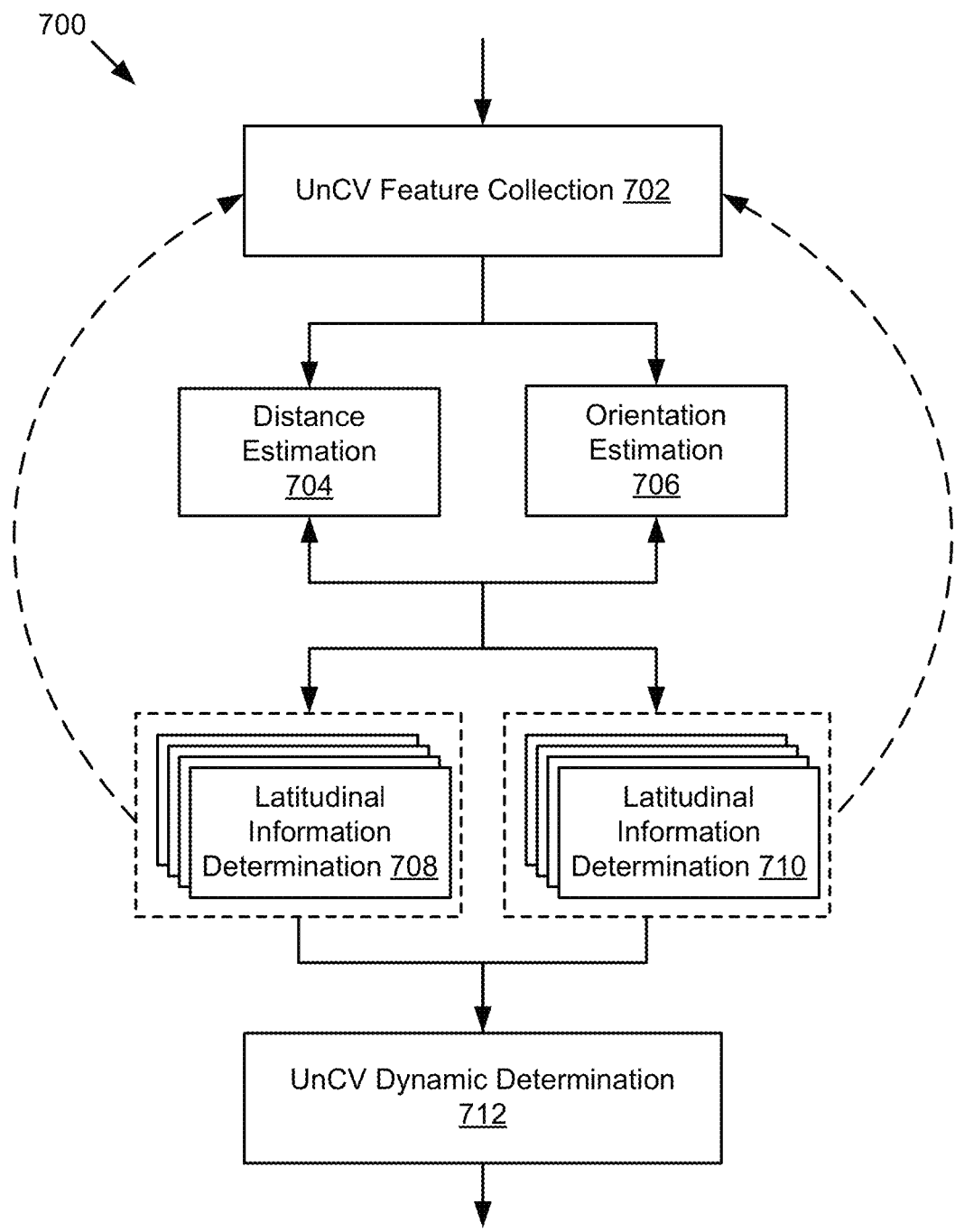
FIG. 7 is a flowchart of an example method for determining dynamics of an unconnected vehicle.

FIG. 6 illustrates an example scenario for tracking CVs and UnCVs. As illustrated, there may be four vehicle platforms close to an intersection. They may include two CVs 103f and 103g, and two UnCVs 103h and 103m. At moment T1, the vehicles 103f and 103m are moving north, the vehicle 103h from the north is making a right turn into the west, while the vehicle 103g stops behind the intersection (e.g., due to a red light). After a certain period of T2-T1 (for example, 3 seconds, 6 seconds, etc.), the positions of the three moving vehicle platforms 103f, 103h, 103m have changed to the T2 positions. The vehicle platform 103m still remains its position during the period. The positons for these different vehicle platforms may be continuously monitored through the period. For instance, the two CVs 103f and 103g may monitor the positons of their own as well as the positons of the two UnCVs 103h and 103m during the period.

The positions and dynamics of the two CVs 103f and 103g may be determined based on the information collected from their monitoring units 402. The monitoring unit 402 in each of the two CV may include a GPS system that provides positioning, navigation, and timing information for that CV. Based on the positioning and timing information, the dynamics of that CV (e.g., moving speed, moving direction, acceleration, etc.) can be easily determined.

The positions and dynamics of the two UnCVs may be determined based on the image data and/or features extracted from the images taken by the two CVs, as further described in FIG. 7A.

FIG. 7A a flowchart of an example method for determining dynamics of an unconnected vehicle. In block 702, the UnCV dynamics processor 254 may collect features associated with the UnCV. This may include collecting the perspective features generated by the feature extractor 204 for an image associated with the UnCV. The collected perspective features may include a moving direction of the CV that takes the image, the sensor position, sensor orientation, lens aperture, focal length, etc. when capturing the image. The sensor position may include its latitudinal and longitudinal coordinates provided in the embedded GPS system or based on another GPS system included in the CV.

In block 704, the UnCV dynamics processor 254 may check the extracted texture feature to identify a size of the UnCV, or even a part of the UnCV (e.g., a wheel, a window, a bumper, headlight, a bumper, etc.) in the image. The size information of the part or the whole of UnCV, when combined with the foal length and/or image sensor information, may allow a determination of the distance of the UnCV relative to the sensor.

In block 706, the UnCV dynamics processor 254 may check the extracted texture feature to identify location information of the UnCV or its parts (e.g., a wheel, a window, a bumper, headlight, a bumper, etc.) in the image. This location information, when combined with the orientation of the image sensor, may be used to identify the orientation of the UnCV in relative to the image sensor orientation.

In some embodiments, the UnCV dynamic processor 254 may include one or more location recognition models or other algorithms to assist with the distance and orientation determinations. The one or more location recognition models may be trained with images containing vehicle platforms of different models taken at different distances and orientations relative to an image sensor. Once trained, these location recognition models may be used to predict the relative distance and orientation of the captured UnCV relative to the image sensor. Based on the determined relative distance and orientation of the UnCV, and the latitude and longitude coordinates of the image sensor, the UnCV dynamics processor 254 may determine latitude information and longitude information of the UnCV in block 708 and block 710.

In some embodiments, a series of images for an UnCV may be taken by the camera sensor 113. A series of longitude coordinate and latitude coordinate of the UnCV may then be determined with each set of longitude and latitude coordinates have a corresponding timestamp. The UnCV dynamics processor 254 may then generate the dynamics for the UnCV based on the series of longitude and latitude coordinates with corresponding timestamps. If more than one UnCV is identified in a road rea, the dynamics for each UnCV may be similarly determined. Once the dynamics of each CV and each identified UnCV is determined, the traffic status for a road area can be effectively determined.

Figure 8A:
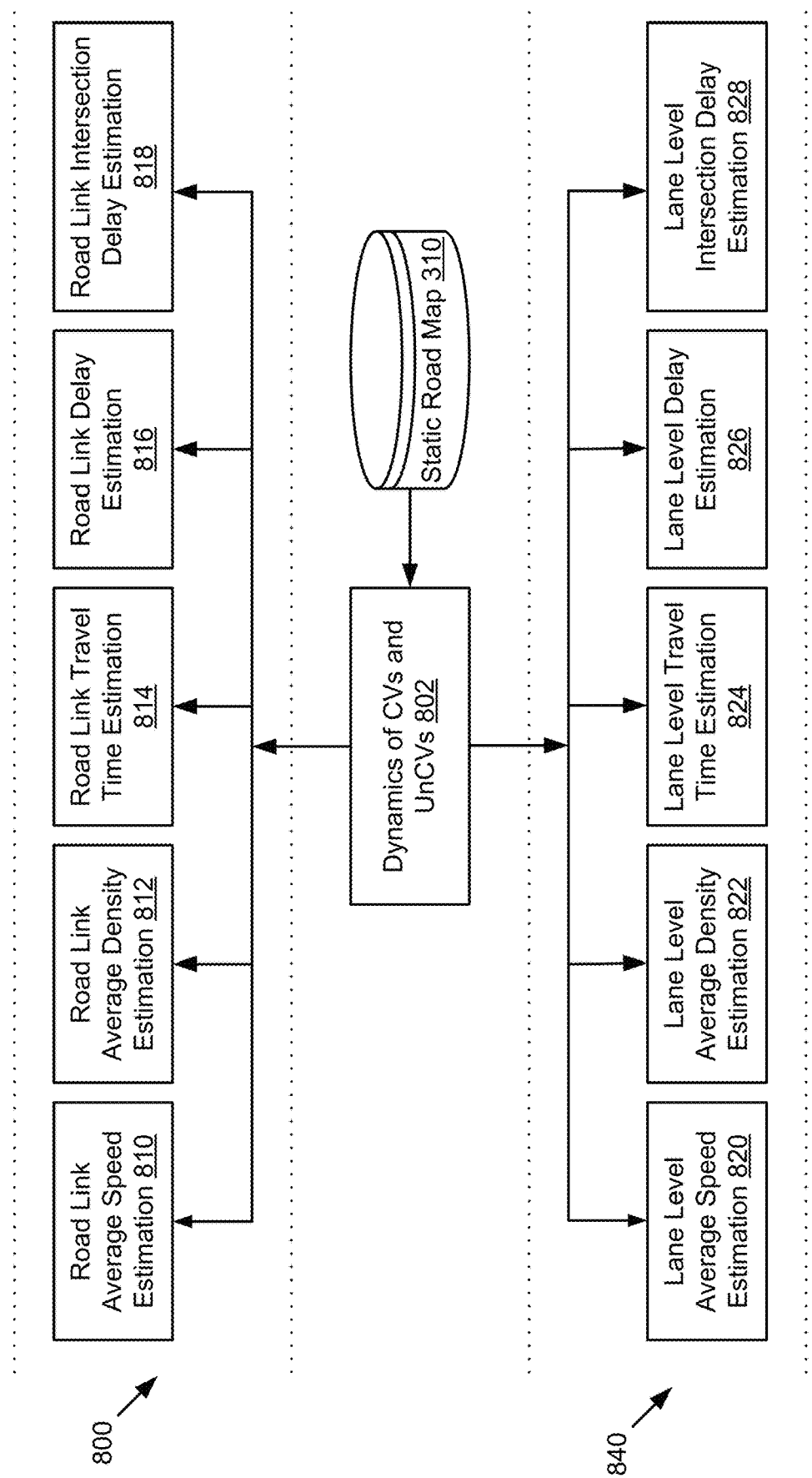
FIG. 8A is a flowchart of an example method for estimating traffic status.

FIG. 8A is a flowchart of an example method for estimating traffic status. As illustrated, the traffic status can be estimated at different levels for provide different level of details in generating the dynamic road map. Method 800 illustrates an example method for estimating traffic status in road link level, while Method 840 illustrates an example method for estimating traffic status in lane level.

In block 810, the road traffic estimator 256 may estimate average speed for a road link. To estimate the average speed for a specific road link, the road traffic estimator 256 may first determine vehicles within that specific road link. The road traffic estimator 256 may check locations of CVs and compare their geolocation information with a defined road link to identify which CVs are located within the road link. The identified CVs within the road link may also have their dynamic status reported, such as speed, direction, etc. Based on the identified CVs, the UnCVs in that road link may also be identified, based on the detected UnCVs from each identified CV. Alternatively, the determined longitudinal and latitudinal information for each UnCV may also be used to identify an UnCV in the road link. The dynamic status for these identified UnCVs may also be identified. The average speed for that specific road link may then be determined by averaging speed of each CV and each identified UnCV.

In block 812, the road traffic estimator 256 may estimate average density of a specific road link. In some embodiments, the average density estimation may be simply calculated by counting a number of total CVs and identified UnCVs passing that road link in a certain period. However, this may provide very limited information for a driver to determine whether he or she should slow down or speed up, as road type and speed limit varies greatly road-by-road. For instance, for a vehicle driving 70 mph on a portion of freeway, the driver may determine it is necessary to slow down until the number of vehicles traveling per hour per lane reaches a flow rate of 1300 vehicle per hour. However, for a vehicle driving 35 mph on a portion of street road, the driver may feel it is necessary to slow down at a much lower flow rate.

In some embodiments, the estimation of average density may take into consideration other factors, such as free-flow speed (e.g., a speed that a vehicle would travel if there is no congestion or other adverse conditions, such as bad weather), average speed of vehicles, capacity, jam density, etc., to provide more accurate density estimation. The road traffic estimator 256 may include an algorithm that considers these factors in determining the average density. The calculated average density may be indicated by an indicator or an index, with different numbers or markers to suggest different average density for a specific road link. Based on this average density indicator or index, a driver may have a better feeling on how crowd in his or her surroundings.

In block 814, the road traffic estimator 256 may estimate travel time to pass a road link. This may be achieved based on the estimated average speed and the length of the road link. In block 816, the map application 124 may also estimate average delay for the road link. This may include monitoring actual time for a vehicle to pass through the road link, which then is compared to anticipated time to pass through the road link. The anticipated time may be determined based on free-flow speed, or simply based on the road speed limit in that road link.

In block 818, the road traffic estimator 256 may also estimate an average delay for a specific intersection in a road link. This may include comparing anticipated time to pass the intersection with actual time to pass the intersection. The anticipated time may simply take time given by the traffic signal, based on data extracted from traffic regulation authorities, or based on a wait time of the first vehicle behind the intersection in a lane without traffic ahead. By summarizing the interaction delays for all vehicles, an average intersection delay may then be obtained.

In certain circumstance, the estimated traffic time and delay in road links may merely provide a rough estimation about traffic situation in an area. A more accurate estimation of traffic situation may require further details for each lane. This is especially true for heavy traffic areas that have frequent turns, freeway entries and exits, etc. The mere road link level estimations may not provide enough information for a vehicle to estimate how long it takes to pass an area. For instance, a left turn or right turn may cost extra time than general forward driving, and traffic in a car-pool lane in a freeway may have different average speed than traffic in a outmost lane with frequent exits or entries. Thus, a lane level estimation of traffic situation may provide more accurate information about the real traffic situation. To estimate lane level traffic status, lane information for each vehicle platform in an area may be necessarily identified. The lane information for a CV may be directly identified based on its GPS information. The lane information for an UnCV may be determined based on the determined longitudinal and latitudinal information of the UnCV relative to the image sensor, as further described in FIG. 8B.

Figure 8B:
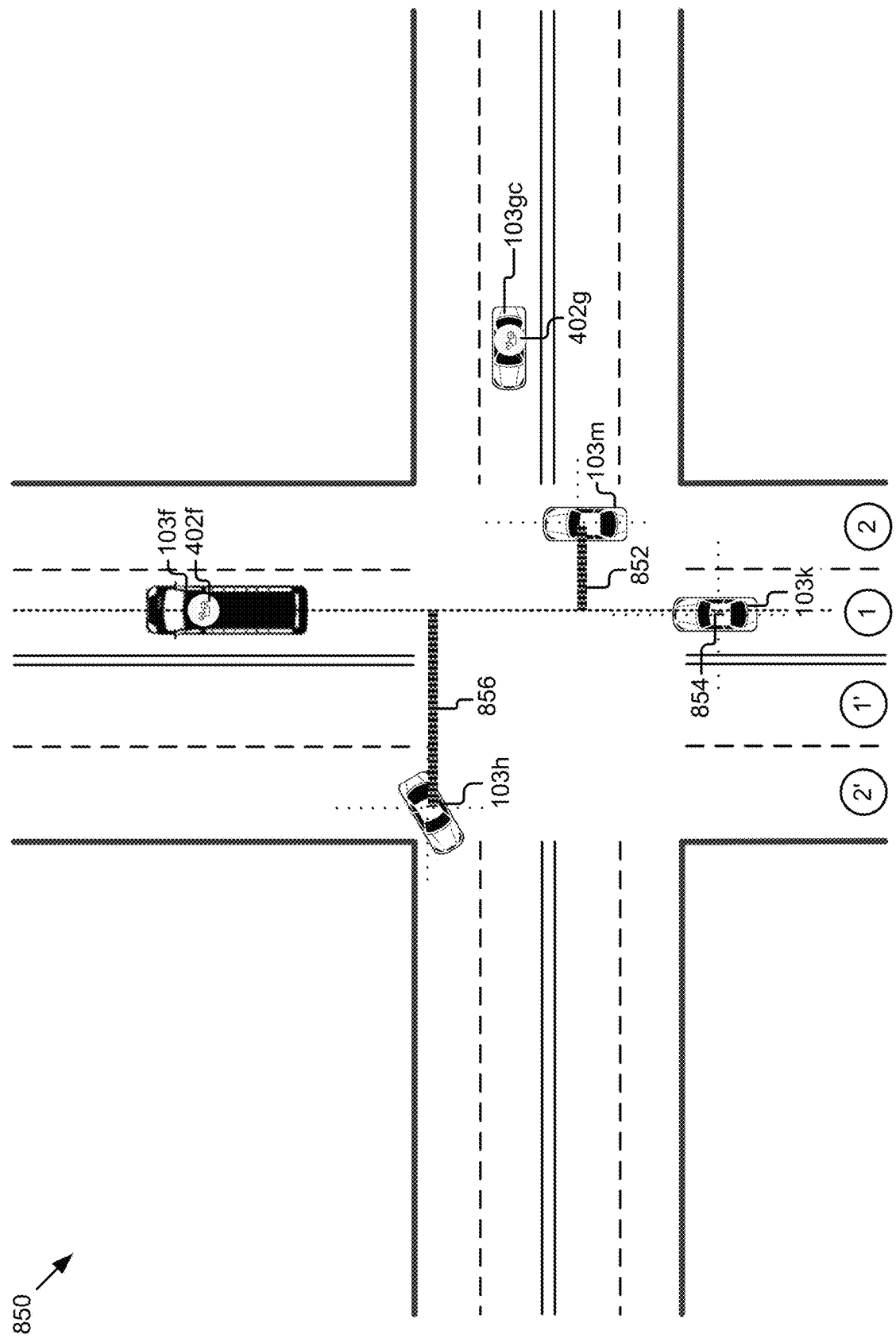
FIG. 8B is an example scenario for determining traffic lanes for unconnected vehicles.

FIG. 8B illustrates an example scenario to determine a specific lane for an identified UnCV. For an identified UnCV, its distance and orientation relative to the image sensor may be estimated by the UnCV dynamic processor 254, as described elsewhere herein. Its longitude and latitudinal information relative to the associated CV may be then correspondingly determined. The determined relative latitudinal information may be used to determine lane information for the identified UnCV. As illustrated in FIG. 8B, the relative latitudinal distances of the three UnCVs 103$h$, 103$k$, and 103$m$ are the lengths 856, 854, and 852, respectively. By comparing the lengths of 856, 854, 852 with the width of the road lane (which may be extracted from the static road map or from a GPS navigation system), which when combined with the relative orientation of each UnCV to the image sensor 113, may allow the determination of lane information of each UnCV. The UnCVs 103$h$, 103$k$, and 103$m$ may be determined to be in lane 2', 1, and 2, respectively.

Returning back to FIG. 8A, after determining lane information of the identified UnCVs, the traffic status for each lane may be further determined in Method 840. In blocks 820, 822, 824, 826, and 828, multiple lane level traffic status estimations are also performed by the road traffic estimator 256. Based on the dynamics determined for UnCVs and CVs, and the identified lane information of the identified UnCVs and CVs, the average speed, average density, average travel time, average delay, and average intersection delay for each lane may be also determined. After each traffic feature is determined or estimated, a dynamic road map may be immediately generated.

FIG. 9 is a flowchart of an example method for generating the dynamic road map 320. In some embodiments, the dynamic road map generation may include two stages, a first stage in data collection, and a second stage in data compiling. As illustrated, the first stage in data collection may include collecting traffic status in block 902, collecting roadside infrastructure information in block 904, collecting static road map in block 906, etc. The collection of roadside infrastructure may further include collecting roadside signs in block 912, accident information in block 914, roadside construction information at 916, traffic signal information in block 918, etc. At stage 2, the dynamic road map generator 260 may compile the collected information to generate a compiled dynamic road map.

In collecting information for generating the dynamic road map, the dynamic road map generator 260 may rely on the information determined by other applications (e.g., the multi-view observation application 102) and/or different components (e.g., the CV dynamic processor 252, the UnCV dynamic processor 254, the road traffic estimator 256, the roadside infrastructure monitor 258) of the map application 124. In some embodiments, the information may be directly retrieved from the vehicle database 121, the data store 126 in the server 101, and/or from a data stored associated with the third-party server(s) 205.

In some embodiments, the data collection stage may also include converting unstructured data into structured data. For instance, the collected information from the third-party server(s) 205 and/or other entities of the system 100 may be heavy texted and unstructured, and thus require to be converted into structured data for later compilation in generating the dynamic road map.

In block 910, the dynamic road map generator 260 may compile the collected information to generate the dynamic road map. Different technologies may be applied by the dynamic road map generator 260 to generate the dynamic road map. In some embodiments, the dynamic road map generator 260 may employ overlaying technique in generating the dynamic road map. The generated dynamic road map may include a hierarchical structure of the digital map layered by time frame. The layered dynamic road map generated that way may include multiple linked layers, each layer providing information relating to different aspects of traffic-related information collected above. For instance, the layered dynamic road map may include a first basic map layer, a second road infrastructure layer, and a third traffic status layer. The organization of information from the second and third layers may be based on the geolocation information corresponding to the basic map in the first layer, which may be then overlaid into the basic map layer to generate the dynamic road map. In some embodiments, different zoom levels for different layers may be also prepared and synchronized in generating the dynamic road map. Different zoom levels may include different details of information so that the generated dynamic road map can be checked at a more zoomed-in level if a user hopes to get more information regarding a subject in the dynamic road map.

In some embodiments, the second road infrastructure layer as described may include additional information besides the information extracted from the images captured by the CVs or collected from the roadside units. For instance, the second infrastructure layer may include traffic regulation information, weather forecast information, etc., pulled from the third-party server(s) 105. For example, by detecting a speeding activity of a vehicle platform 103, a generated alert may include an exact amount of fine for presenting to the occupant of the vehicle platform 103. The exact amount of fine may be determined based on the traffic regulation information included in this road infrastructure layer. For another example, if the weather forecast information in this layer indicates a 100% chance of raining at a specific time and zone, a speed limit may be adjusted to reflect the expected weather condition for that specific time and zone in the generated dynamic road map.

In some embodiments, the third traffic status layer as described may include other information related to the traffic status determined by the road traffic estimator 256. For instance, the third traffic status layer may include weather information, event information, etc. pulled from the third-party server(s) 105 or from the sensors 113 associated with the vehicle platform 103. For instance, when a vehicle platform 103 is detected entering a congestion area due to a football game, the third status layer may provide an average delay for this moment, as well as possible delay for the next certain period (e.g. 30 minutes, 1 hour, etc.), which may be determined based on the start time and end time of the game, as well as the past experience in the game days. For another instance, the third traffic status layer may also include weather information that may affect traffic speed. For instance, a heavy snow, detected by a sensor 113 or pulled from a third-party server 105, may affect the estimation of the average delay, average speed, average travel time, etc. in the dynamic road map. In some embodiments, the generated dynamic road map 320 may additionally present these event information, weather information, etc. to the vehicle occupant to explain what causes the estimated delay (with or without a user request).

It should be understood that the exact number of layers and what information included in each layer in generating the dynamic road map may vary and be different from the above described. For instance, there might be a fourth layer that includes information for other mobile objects within traffic areas, such as pedestrians, animals, bicycles, person with wheelchairs, persons with scooters, or even robots, etc., that can be identified from the images captured by the CVs. In some embodiments, there might be more or less than three layers in generating the dynamic road map. Different layers may be also not organized or compiled in the exact same order as above described, or the information included in each layer may be not exactly the same as above described but can be changed and remixed for different purposes. Other embodiments and methods to generate the dynamic road map are also contemplated.

Figure 10:
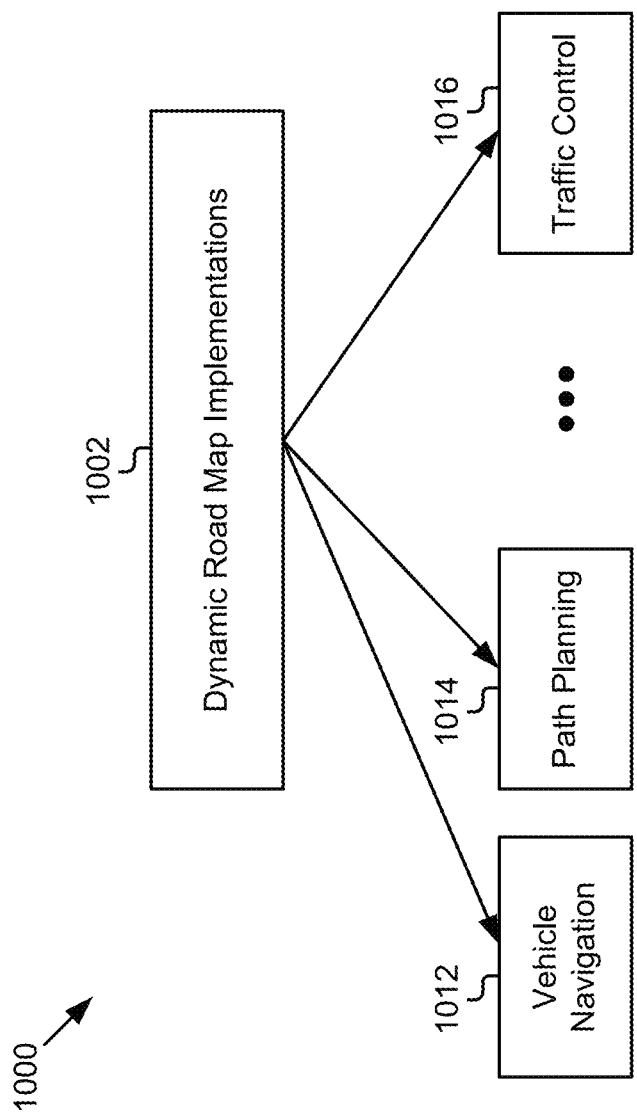
FIG. 10 is a flowchart of an example method for implementing applications of a dynamic road map.

FIG. 10 is a flowchart of an example method for implementing applications of the generated dynamic road map. Once generated, a dynamic road map may be integrated into many applications in public or private settings. For public applications, it may be used to enhance local traffic control and management (e.g., assisting with notifications of actual accidental sites, assisting with traffic signal modifications to ease heavy traffic congestion areas, road links, or lanes, etc.). For private applications, it may be used for navigation applications and path planning, among others.

In block 1002, the system 100 may integrate the generated dynamic road map 320 into various applications. In some embodiments, the integration of the dynamic road map 320 may employ wired or wireless communications to provide real-time traffic information to corresponding terminals. In some embodiments, the dynamic road map 320 may be seamlessly and instantly transmitted to corresponding terminals once generated or updated (e.g., to a navigation application associated with the vehicle via wired or wireless communication). In some embodiments, the dynamic road map 320 may be transmitted into other terminals at a relatively lower frequency (compared to map updating rate), to save communication bandwidth. For instance, the dynamic road map may be sent to other terminals every 1, 2, or 3 minutes or even longer, or only until there is a noticeable change (e.g., a changed average lane delay). In some embodiments, the dynamic road map may be not transmitted until a request is received.

In block 1012, the map application 124 may generate and display graphical user interfaces that provide navigation functionality based on the dynamic road map data. for example, the dynamic road map may be integrated into the maps and routes displayed by the map application 124. In some embodiments, the map application 124 may overlay traffic-related information onto a map covering a location of the user based on the dynamic road map data. In some embodiments, the highly contextual information may be dynamically displayed with user prompts and/or warnings.

A vehicle platform 103 may include output device(s) coupled to the bus 154 which may comprise any devices configured to output or display information to a user or other devices, such as, but not limited to, a touch screen for displaying notifications, navigation information, multimedia information, settings, etc., an audio reproduction device (e.g., speaker) for delivering sound information, a display/monitor for presenting texting or graphical information to the user, etc. The outputting information may be text, graphic, tactile, audio, video, and other information that may be understood by the driver and/or passengers or the other devices, or may be data, logic, programming that can be readable by the operating system of the vehicle platform 103 and/or other computing devices. The output device(s) may be coupled to other components of the vehicle platform 103 directly or through intervening controllers. In some implementations, a set of output device(s) 130 may be included in or form a control panel that a person may interact with to adjust settings and/or control of a vehicle platform 103 (e.g., driver controls, infotainment controls, guidance controls, safety controls, etc.).

In some embodiments, the computing system 152 may execute a control or map application 124 that may receive the driver or passenger input and process it (e.g., interpret button press, voice command, etc.), and implement an action corresponding to the command, opt-in to autonomous control, select a navigation route, receive an alert of a traffic situation, etc. For example, the map application 124 may present information about a traffic situation and/or other nearby or approaching situations. The output device(s) may be coupled to other components of the vehicle platform 103 directly or through intervening controllers. In some implementations, a set of output device(s) may be included in or form a control panel that a person may interact with to adjust settings and/or control of a vehicle platform 103 (e.g., driver controls, infotainment controls, guidance controls, safety controls, advanced driver assistance system (ADAS) settings and/or controls, etc.).

A vehicle platform 103 may be equipped with various in-vehicle ADAS, which are onboard systems that assist the driver during the driving process, and often increase vehicle and road safety. Example ADAS include, but are not limited to, adaptive cruise control (ACC), glare-free high beam and pixel light, adaptive light control (e.g., swiveling curve lights), anti-lock braking system, automatic parking, automotive navigation system with typically GPS and TMC for providing up-to-date traffic information, automotive night vision, blind spot monitor, collision avoidance system (Pre-crash system), crosswind stabilization, cruise control, driver drowsiness detection, driver Monitoring System, electric vehicle warning sounds used in hybrids and plug-in electric vehicles, emergency driver assistant, forward collision warning, intersection assistant, hill descent control, intelligent speed adaptation or intelligent speed advice (ISA), lane keep assist system, lane departure warning system, lane change assistance, night vision, parking sensor, pedestrian protection system, inclement weather detection, surround view system, tire pressure monitoring, traffic sign recognition, turning assistant, vehicular communication systems, wrong-way driving warning, etc.

In association with a vehicle control system or the map application 124, the user may select a dedicated hardware button coupled to the bus 154 and/or a digital button presented on a touch-sensitive display (coupled to the bus 154) of the vehicle platform, or issue a voice command via a voice system (e.g., microphone, etc., coupled to the bus 154), etc. The vehicle platform 103 may include one or more input device(s) 130, which may comprise any standard devices configured to receive a variety of control inputs (e.g., gestures, voice controls) from a person or other devices. Non-limiting example input devices 130 may include a touch screen for inputting texting information, making selection, and interacting with the user 115; motion-detecting input devices; audio input devices; other touch-based input devices; keyboards; pointer devices; indicators; and/or any other inputting components for facilitating communication and/or interaction with a person or the other devices. The input device(s) may be coupled to other components of the vehicle platform 103 either directly or through intervening controllers to relay inputs/signals received from people and/or sensor(s).

In an example, the map application 124 may provide traffic density indication for an area, estimated delay, lane level average speed, time to pass a planned route, etc., in a graphical user interface and display it on a display of the computer device 152 (e.g., an in-dash display, a display of portable electronic device of the user, a heads-up display, etc.) to the vehicle occupant. The occupant may select to change a route, accept a recommended route change by the map application 124 based on the dynamic map data and/or the dynamic(s) of the vehicle, etc.

In some embodiments, the map application 124 may facilitate assisted and/or automated driving based on the generated dynamic road map. For instance, the dynamic road map may be integrated into a drive-assistance system executed by the processor 115 to enable instant reaction through automatic monitoring, alerting, braking, steering activities, etc. For example, when a vehicle turns on a signal for a left lane change, the real-time data from the dynamic road map may detect a left lane vehicle passing from behind at a high-speed. An alert notification may be automatically generated based on the dynamic road map to alert the occupant(s) of the vehicle for a potential risk (e.g., via one or more output devices (e.g., on a display, via audio, tactile vibration, etc.). The alert notification may in some cases comprise a command for an ADAS of the vehicle, such as crash avoidance, automatic braking and/or obstacle avoidance, etc. The ADAS may control the one or more actuator(s) 128 of the vehicle to help ensure the safety of the occupants and others.

In an example, one or more instructions may be generated based on the information from the dynamic road map, and processed by a computing device of the vehicle (e.g., an ECU, computer processor, and/or vehicle operating system, etc.) of the vehicle to control one or more actuators 128 of a moving vehicle platform (e.g., accelerator, braking system, steering system, etc., actuators, etc.), which in turns navigates the vehicle platform to avoid the potential risks.

In block 1014, the map application 128 may integrate the generated dynamic road map into path/route planning. Path/route planning may depend on various parameters, such as traffic status, speed limits, objectives of drivers, etc. In some embodiments, the integration of the dynamic road map into the path/route planning may happen at different levels. For instance, the integration may include a global level integration for generating possible smooth, global paths/routes to reach a goal position or destination after considering traffic annotated in the map. The integration may also include a local level integration for generating smooth trajectories (e.g., which lane(s)) in a specific area. For instance, based on the information of average lane delay from the dynamic road map, the local level integration in path/route planning may include assisting with a selection of a specific lane for each part of the route selected in the global level. In some embodiments, the selected route/lane(s) may be dynamically updated to respond to a traffic change identified from the updated dynamic road map, allowing the vehicle to smoothly navigate through a highly dynamic area.

In block 1016, the system 100 may integrate the generated dynamic road map into traffic control and management platforms or systems. This may include the integration of the dynamic road map 320 into any public or private platform that assists with monitoring and controlling the traffic-related activities. For instance, the system 100 may share the generated dynamic road map with city control centers to assist with monitoring the traffic of the cities, or integrate the dynamic road map to personal navigation applications to assist with their navigations. In some embodiments, the system 100 may also extract certain relevant information from the dynamic road map and transmit it to potential receivers or even to the public media for sharing the relevant information. For instance, the system 100 may automatically generate one or more alerts for an accident, congestion, an area to avoid, etc., and transmit the alerts to corresponding departments, personnel, or to a social media platform to share with the public. The generated dynamic road map 320 may provide an integrated, insightful, very detailed, and comprehensive information source to these public and private platforms, to facilitate more intelligent, efficient control to improve traffic flow and safety of the transportation.

In the above description, for purposes of explanation, numerous specific details are set forth in order to provide a thorough understanding of the present disclosure. However, it should be understood that the technology described herein could be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks.

Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A method comprising:
    determining a current geographic location of first vehicle platform;
    determining, using one or more sensors of the first vehicle platform, one or more first vehicle dynamics for the first vehicle platform;
    receiving a first set of images captured by one or more vehicle platform sensors associated with the first vehicle platform, the first set of images relating to a second vehicle platform located proximate the first vehicle platform;
    determining one or more second vehicle dynamics of the second vehicle platform based on the first set of images captured by the one or more vehicle platform sensors of the first vehicle platform;
    generating a dynamic road map based on the one or more first vehicle dynamics of the first vehicle platform and the one or more second vehicle dynamics of the second vehicle platform; and
    navigating, based on the dynamic road map, one or more of the first vehicle platform, the second vehicle platform, and another vehicle platform relative to the first vehicle platform or the second vehicle platform.

2. The method of claim 1, further comprising:
    receiving a second set of images captured by one or more vehicle platform sensors associated with a third vehicle platform, the second set of images relating to the second vehicle platform; and
    determining an identity of the second vehicle platform based on a comparison of the first set of images captured from the first vehicle platform and the second set of images captured from the third vehicle platform.

3. The method of claim 1, wherein determining the one or more second vehicle dynamics of the second vehicle platform based on the first set of images captured from the first vehicle platform comprises:
    detecting a first object in the first set of images captured from the first vehicle platform;
    determining the first object in the first set of images to be driving related; and
    determining the one or more second vehicle dynamics of the second vehicle platform by determining one or more dynamics of the first object.

4. The method of claim 1, wherein determining the one or more second vehicle dynamics of the second vehicle platform based on the first set of images captured from the first vehicle platform comprises:
    determining relative latitudinal information and longitudinal information of the second vehicle platform relating to the first vehicle platform based on the first set of images captured from the first vehicle platform; and
    determining the one or more second vehicle dynamics of the second vehicle platform based on the relative latitudinal information and longitudinal information of the second vehicle platform relating to the first vehicle platform and the one or more first vehicle dynamics of the first vehicle platform.

5. The method of claim 1, wherein generating the dynamic road map based on the one or more first vehicle dynamics of the first vehicle platform and the one or more second vehicle dynamics of the second vehicle platform comprises:
    determining road link-based traffic information including one or more of road link average speed, road link average density, road link travel time, road link average delay, and road link intersection average delay;
    determining lane-based traffic information including one or more of lane average speed, lane average density, lane travel time, lane average delay, and lane intersection average delay; and
    integrating the road link-based traffic information and the lane-based traffic information into a static road map to generate the dynamic road map.

6. The method of claim 1, wherein the first vehicle platform is a connected vehicle platform that is equipped with network access for wireless data communication, and the second vehicle platform is an unconnected vehicle platform without the network access.

7. The method of claim 1, wherein generating the dynamic road map further comprises:
   determining one or more dynamics of one or more connected vehicle platforms;
   determining one or more dynamics of one or more unconnected vehicle platforms based on one or more images captured by one or more vehicle platform sensors of one or more of the one or more connected vehicle platforms; and
   generating the dynamic road map based on the one or more dynamics of the one or more connected vehicle platforms and the one or more dynamics of the one or more unconnected vehicle platforms.

8. The method of claim 1, wherein the first set of images captured by the one or more vehicle platform sensors associated with the first vehicle platform include a series of images of the second vehicle platform captured in a time window by one of the one or more vehicle platform sensors associated with the first vehicle platform.

9. The method of claim 1, further comprising:
   determining one or more roadside infrastructure information based on the first set of images captured by the one or more vehicle platform sensors of the first vehicle platform; and
   generating the dynamic road map based on the one or more roadside infrastructure information.

10. The method of claim 1, further comprising:
    determining one or more dynamics for a third vehicle platform;
    generating one or more instructions for the third vehicle platform based on the one or more dynamics of the third vehicle platform and the generated dynamic road map; and
    controlling one or more actuators of the third vehicle platform to navigate the third vehicle platform according to the one or more instructions.

11. The method of claim 1, further comprising:
    identifying a request for a route plan from one device associated with a moving platform;
    identifying lane level traffic status for one or more candidate routes based on the dynamic road map; and
    determining an optimal route based on the lane level traffic status of the one or more candidate routes.

12. The method of claim 1, further comprising:
    generating one or more alerts based on information of the dynamic road map; and
    transmitting the one or more alerts to corresponding parties for their attention.

13. A system comprising:
    one or more processors including logic executable to perform operations comprising:
      determining a current geographic location of first vehicle platform;
      determining, using one or more sensors of the first vehicle platform, one or more first vehicle dynamics for the first vehicle platform;
      receiving a first set of images captured by one or more vehicle platform sensors associated with the first vehicle platform, the first set of images relating to a second vehicle platform located proximate the first vehicle platform;
      determining one or more second vehicle dynamics of the second vehicle platform based on the first set of images captured by the one or more vehicle platform sensors of the first vehicle platform;
      generating a dynamic road map based on the one or more first vehicle dynamics of the first vehicle platform and the one or more second vehicle dynamics of the second vehicle platform; and
      navigating, based on the dynamic road map, one or more of the first vehicle platform, the second vehicle platform, and another vehicle platform relative to the first vehicle platform or the second vehicle platform.

14. The system of claim 13, further comprising:
    receiving a second set of images captured by one or more vehicle platform sensors associated with a third vehicle platform, the second set of images relating to the second vehicle platform; and
    determining an identity of the second vehicle platform based on a comparison of the first set of images captured from the first vehicle platform and the second set of images captured from the third vehicle platform.

15. The system of claim 13, wherein determining the one or more second vehicle dynamics of the second vehicle platform based on the first set of images captured from the first vehicle platform comprises:
    detecting a first object in the first set of images captured from the first vehicle platform;
    determining the first object in the first set of images to be driving related; and
    determining the one or more second vehicle dynamics of the second vehicle platform by determining one or more dynamics of the first object.

16. The system of claim 13, wherein determining the one or more second vehicle dynamics of the second vehicle platform based on the first set of images captured from the first vehicle platform comprises:
    determining relative latitudinal information and longitudinal information of the second vehicle platform relating to the first vehicle platform based on the first set of images captured from the first vehicle platform; and
    determining the one or more second vehicle dynamics of the second vehicle platform based on the relative latitudinal information and longitudinal information of the second vehicle platform relating to the first vehicle platform and the one or more first vehicle dynamics of the first vehicle platform.

17. The system of claim 13, wherein generating the dynamic road map based on the one or more first vehicle dynamics of the first vehicle platform and the one or more second vehicle dynamics of the second vehicle platform:
    determining road link-based traffic information including one or more of road link average speed, road link average density, road link travel time, road link average delay, and road link intersection average delay;
    determining lane-based traffic information including one or more of lane average speed, lane average density, lane travel time, lane average delay, and lane intersection average delay; and
    integrating the road link-based traffic information and the lane-based traffic information into a static road map to generate the dynamic road map.

18. The system of claim 13, wherein the first vehicle platform is a connected vehicle platform that is equipped with network access for wireless data communication, and the second vehicle platform is an unconnected vehicle platform without the network access.

19. The system of claim 13, wherein generating the dynamic road map further comprises:
- determining one or more dynamics of one or more connected vehicle platforms;
- determining one or more dynamics of one or more unconnected vehicle platforms based on one or more images captured by one or more vehicle platform sensors of one or more of the one or more connected vehicle platforms; and
- generating the dynamic road map based on the one or more dynamics of the one or more connected vehicle platforms and the one or more dynamics of the one or more unconnected vehicle platforms.

20. The system of claim 13, wherein the first set of images captured by the one or more vehicle platform sensors associated with the first vehicle platform include a series of images of the second vehicle platform captured in a time window by one of the one or more vehicle platform sensors associated with the first vehicle platform.

21. The system of claim 13, further comprising:
- determining roadside infrastructure information based on the first set of images captured by the one or more vehicle platform sensors of the first vehicle platform; and
- generating the dynamic road map based on the roadside infrastructure information.

22. The system of claim 13, further comprising:
- determining one or more dynamics for a third vehicle platform;
- generating one or more instructions for the third vehicle platform based on the one or more dynamics of the third vehicle platform and the generated dynamic road map; and
- controlling one or more actuators of the third vehicle platform to navigate the third vehicle platform according to the one or more instructions.

23. The system of claim 13, further comprising:
- identifying a request for a route plan from one device associated with a moving platform;
- identifying lane level traffic status for one or more candidate routes based on the dynamic road map; and
- determining an optimal route based on the lane level traffic status of the one or more candidate routes.

24. The system of claim 13, further comprising:
- generating one or more alerts based on information of the dynamic road map; and
- transmitting the one or more alerts to corresponding parties for their attention.

* * * * *